US008099090B2

(12) United States Patent
Postma et al.

(10) Patent No.: US 8,099,090 B2
(45) Date of Patent: *Jan. 17, 2012

(54) INFORMATION SYSTEM WITH DETACHABLE INFORMATION MODULE

(75) Inventors: Jessica Postma, Hamilton (CA); Jason T. Griffin, Kitchener (CA); James C. Infanti, Waterloo, CA (US); Mihal Lazaridis, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/965,222

(22) Filed: Dec. 10, 2010

(65) Prior Publication Data
US 2011/0077050 A1  Mar. 31, 2011

Related U.S. Application Data

(63) Continuation of application No. 10/146,556, filed on May 15, 2002, now Pat. No. 7,885,645.

(60) Provisional application No. 60/291,303, filed on May 15, 2001.

(51) Int. Cl.
*H04M 3/42* (2006.01)

(52) U.S. Cl. .......... 455/417; 455/459; 455/461; 455/45; 455/462; 379/211.01; 379/211.02; 379/212.01; 379/428.02

(58) Field of Classification Search ............... 455/417, 455/459, 461, 45, 462; 379/211.01, 211.02, 379/212.01, 428.02
See application file for complete search history.

(56) References Cited

U.S. PATENT DOCUMENTS

| 4,829,554 | A  | * | 5/1989  | Barnes et al. ............. 455/432.1 |
| 5,390,233 | A  | * | 2/1995  | Jensen et al. ................. 455/417 |
| 5,633,920 | A  |   | 5/1997  | Kikinis et al. |
| 5,881,149 | A  |   | 3/1999  | Weatherill |
| 5,903,833 | A  |   | 5/1999  | Jonsson et al. |
| 5,943,627 | A  |   | 8/1999  | Kim et al. |
| 6,253,088 | B1 | * | 6/2001  | Wenk et al. ................. 455/462 |
| 6,266,539 | B1 | * | 7/2001  | Pardo ......................... 455/556.2 |
| 6,647,103 | B2 | * | 11/2003 | Pinard et al. ............ 379/110.01 |
| 6,836,643 | B2 |   | 12/2004 | Shealtiel |
| 6,961,584 | B2 | * | 11/2005 | Leedom, Jr. ............... 455/552.1 |

(Continued)

FOREIGN PATENT DOCUMENTS
EP      0 840 465 A2    5/1998
(Continued)

OTHER PUBLICATIONS

Dalgic et al.: "True Number Portability and Advanced Call Screening in a SIP-Based IP Telephony System," IEEE Communications Magazine, Jul. 1999, pp. 96-101.

*Primary Examiner* — Pierre-Louis Desir
(74) *Attorney, Agent, or Firm* — Jones Day

(57) ABSTRACT

A unitary handheld portable module includes a keypad for entering data and a display for displaying data. A base module is configured to be coupled with and communicate through a telephone line and includes a keypad for dialing a telephone number and a display for displaying information. The portable and base modules are configured to have a mounted configuration in which the portable module is removably mounted on the base module and covers the base module's display, and the modules communicate with each other for the portable module's display to display information relating to operation of the base module.

17 Claims, 29 Drawing Sheets

U.S. PATENT DOCUMENTS

| | | | |
|---|---|---|---|
| 7,171,221 B1 * | 1/2007 | Amin et al. | 455/462 |
| 2002/0004385 A1 | 1/2002 | Yamamoto et al. | |
| 2002/0068575 A1 | 6/2002 | Agrawal et al. | |
| 2002/0086703 A1 * | 7/2002 | Dimenstein et al. | 455/557 |
| 2008/0004002 A1 * | 1/2008 | Chin et al. | 455/425 |
| 2008/0022089 A1 * | 1/2008 | Leedom | 713/156 |

FOREIGN PATENT DOCUMENTS

| | | |
|---|---|---|
| WO | 94/29966 A1 | 12/1994 |
| WO | 99/65209 A1 | 12/1999 |
| WO | 00/62431 A1 | 10/2000 |
| WO | 01/24503 A1 | 4/2001 |

* cited by examiner

INFORMATION SYSTEM WITH DETACHABLE INFORMATION MODULE

CROSS REFERENCE TO RELATED APPLICATIONS

This is a continuation of U.S. patent application Ser. No. 10/146,556, filed May 15, 2002, which claims priority from U.S. Provisional Application No. 60/291,303, filed May 15, 2001, both applications hereby incorporated herein by reference.

BACKGROUND

1. Field of the Invention

This relates to information systems in general, and particularly to an information system having a detachable module.

2. Description of Related Art

Many people today use portable devices such as personal digital assistants (PDA), cellular phones, pagers, wireless modems, wireless email devices, and other devices. These devices, and other devices, such as computers, telephones, scanners, printers, facsimile machines, etc., operate substantially independently from each other. For example, a user's desktop telephone set and cellular telephone may provide similar communication functionality, but each operates independently and is not designed for integration or operation with each other. Where the telephone set and cellular telephone provide for storage and retrieval of contact information, such as names and telephone numbers, the memory subsystems on each device are also independent and require the user to manually update both memory subsystems in order to maintain accuracy of the contact information. Furthermore, if the user has another portable device, such as a PDA, the memory subsystem of the PDA must likewise be updated to maintain accuracy of the contact information stored in the cellular telephone and the telephone set. In summary, these devices do not readily interoperate.

SUMMARY

An information system includes a first module and a second module that interoperate over first and second communication ports. Interoperation over the first and second communication ports provides the first module access to functions and features of the second module, and likewise provides the second module access to functions and features of the first module. The first and second modules may further be operable to communicate over first and second networks, respectively.

DETAILED DESCRIPTION

An information system illustratively comprises a portable module and a base module. The portable module includes a first communication port, a first processing subsystem, and a first memory subsystem for storing data, and is operable to perform a first set of functions. The portable module may also be operable to communicate over a first network. The base module includes a second communication port, a second processing subsystem, and a second memory subsystem, and is operable to perform a second set of functions. The base module may also be operable to communicate over a second network.

The portable module and the base module interoperate over the first and second communication ports. Interoperation over first and second communication ports provides for information transfer between the portable module and the base module, and may also provide the portable module access to functions and features of the base module, and likewise may also provide the base module access to functions and features of the portable module.

In one embodiment, the portable module is a portable data module and the base module is a communication module. Illustratively, the portable data module may be a PDA and the communication module may be a telephone. The portable data module may also be operable to communicate over a wireless network. The portable data module and communication module interoperate over first and second communication ports.

In another embodiment, the portable module is a portable communication module and the base module is a communication module. Illustratively, the portable module may be a cellular telephone and the communication module may be a telephone. The portable communication module and communication module interoperate over first and second communication ports.

In another embodiment, the portable module is a portable data module and the base module is a computer device. Illustratively, the portable data module may be a PDA and the computer device may be a computer or computer peripheral, such as a printer or scanner. The portable data module may also be operable to communicate over a wireless network. The portable data module and base module interoperate over first and second communication ports.

Figure 1:
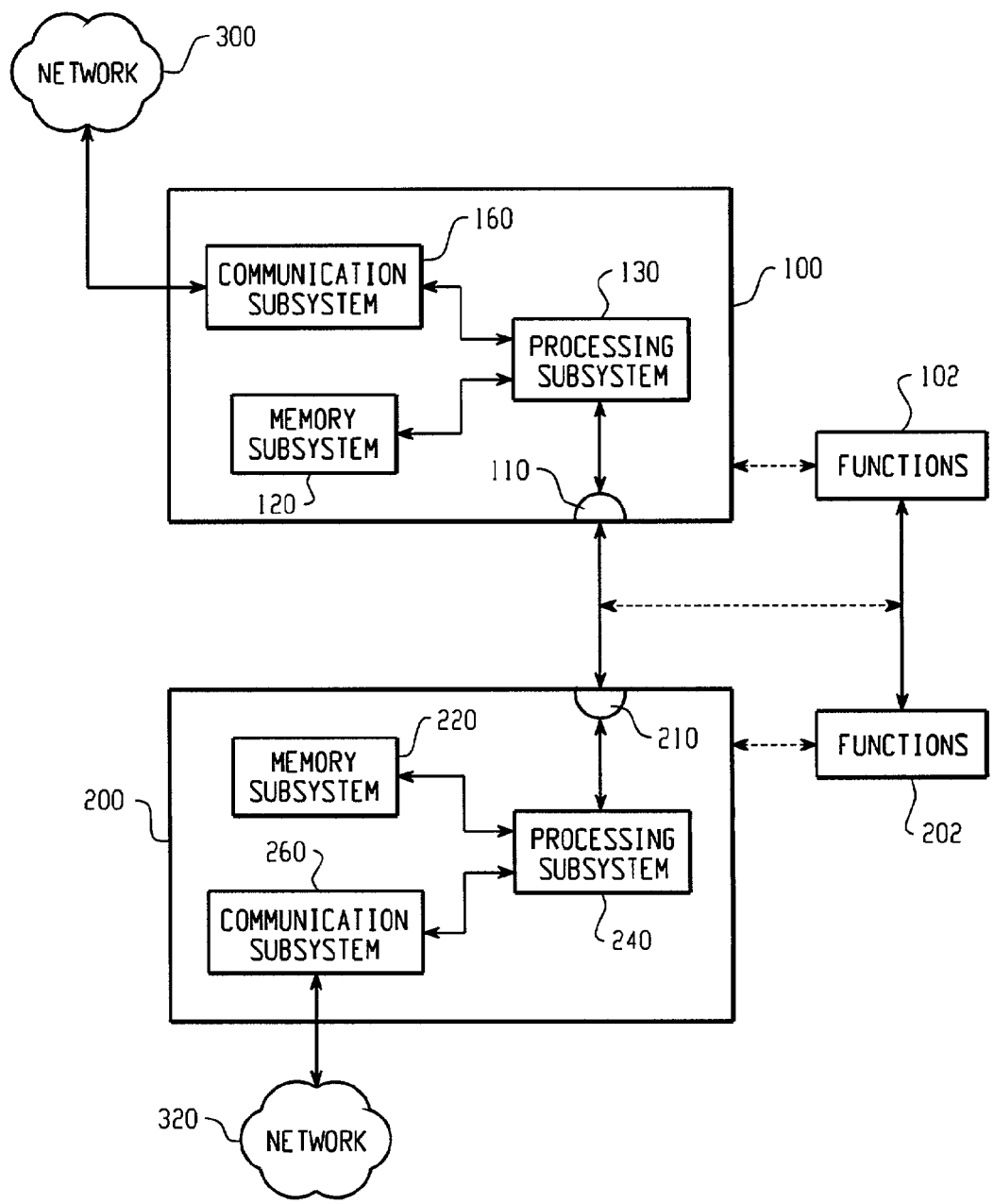
FIG. 1 is a block diagram of an information system comprising a portable module and a base module that interoperate over first and second communication ports.

FIG. 1 is a block diagram of an information system comprising a portable module 100 and a base module 200 that interoperate over first and second communication ports 110 and 210.

The portable module 100 is operable to perform functions 102 and comprises a first communication port 110, a first memory subsystem 120 for storing data, and a first processing subsystem 130. The first processing subsystem 130 has access to the first memory subsystem 120 and the first communication port 110. The portable module 100 preferably stores contact information data in the first memory subsystem 120.

The portable module 100 may also be operable to communicate over a first communication network 300 through a first communication subsystem 160. The portable module 100 may be realized by a wireless mobile communication device such as a cellular telephone, a pager, a wireless e-mail communication device or a PDA enabled for wireless communications, a wireless modem, or other such devices.

The base module 200 is operable to perform functions 202 and comprises a second communication port 210, a second memory subsystem 220 for storing data, and a second processing subsystem 240. The base module 200 may also be operable to communicate over a second communication network 320 through a second communication subsystem 260.

The first and second communication ports 110 and 210 facilitate data transmission and reception between the portable module 100 and base module 200. The portable module 100 and the base module 200 interoperate when in communication over communication ports 110 and 210. Interoperation over the first and second communication ports 110 and 210 provides for information transfer between the portable module 100 and the base module 200, and may also provide the portable module 100 access to functions 202 and the base module 200 access to functions 102.

Figure 2:
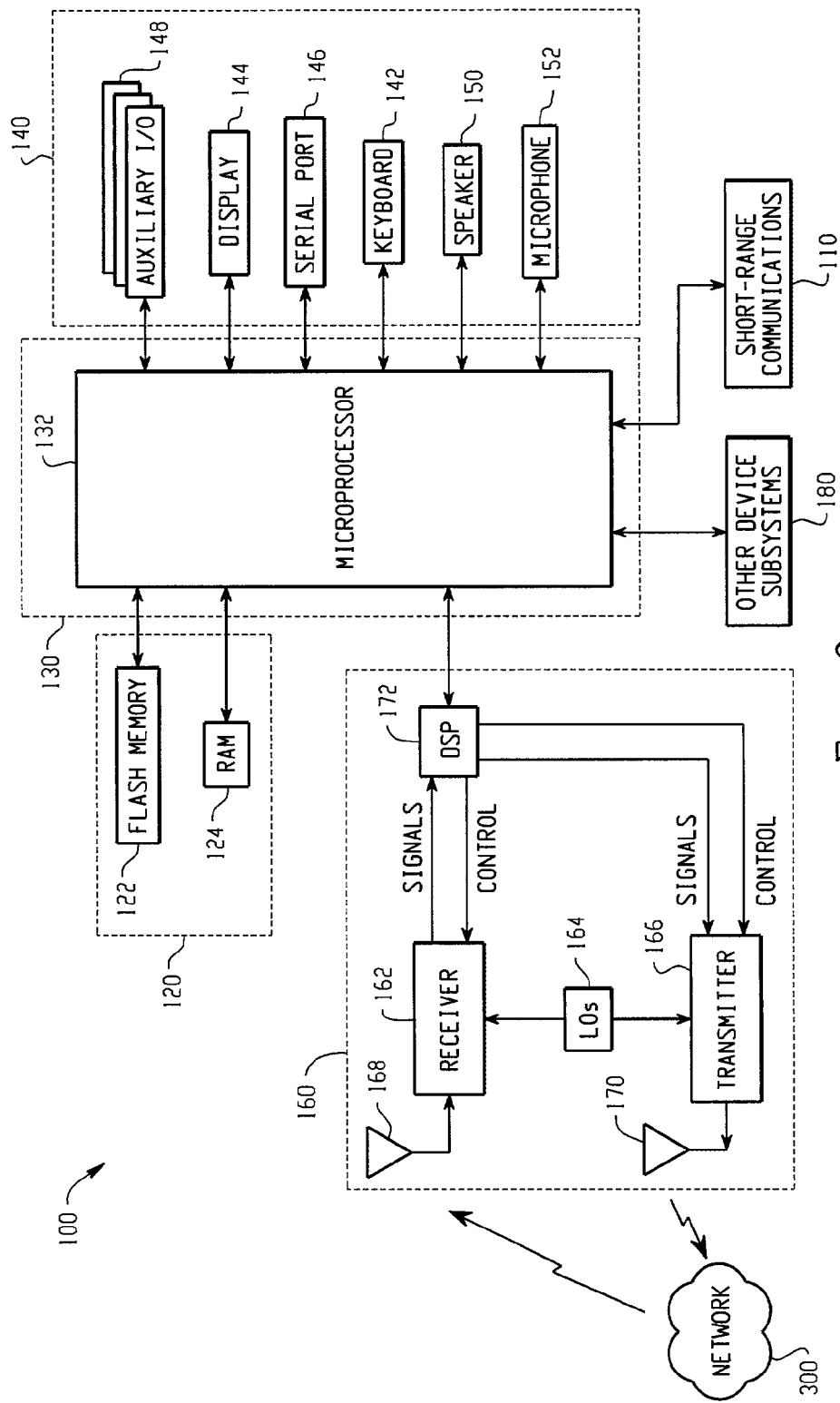
FIG. 2 is a block diagram of an example portable module.

FIG. 2 is a block diagram of an example portable module 100. The portable module 100 preferably performs resident functions of storing and retrieving data in the first memory subsystem 120. The portable module 100 may also perform other resident functions, such as contact data management, calculator functions, calendar functions, etc. Additionally, the portable module 100 preferably performs communication functions, such as voice and/or data communication over a wireless network 300, and communicating with computer systems on the Internet. Depending on the functionality provided by the portable module 100, the portable module 100 may be realized by a PDA, a data messaging device, a two-way pager, a cellular telephone with data messaging capabilities, a wireless Internet appliance or other data communication devices.

If the portable module 100 communicates over the wireless network 300, communication functions are performed through a communication subsystem 160. Network access requirements may vary depending upon the type of network 300. For example, in the Mobitex™ and DataTAC™ networks, the portable modules 100 are registered on the network using a unique identification number associated with each portable module 100. In GPRS networks however, network access is associated with a subscriber or user of a portable module 100. A GPRS device therefore requires a subscriber identity module, commonly referred to as a SIM card, in order to operate on a GPRS network. Other communication networks may have different access requirements.

When required network registration or activation procedures have been completed, the portable module 100 may send and receive communication signals over the network 300. Signals received by the antenna 168 through the network 300 are input to the receiver 162, which may perform such common receiver functions as signal amplification, frequency down conversion, filtering, channel selection, analog to digital conversion and the like.

Illustratively, the receiver 162 performs analog to digital conversion. Analog to digital conversion of a received signal allows more complex communication functions, such as demodulation and decoding to be performed in the DSP 172. In a similar manner, signals to be transmitted are processed, including modulation and encoding for example, by the DSP 172 and input to the transmitter 166 for digital to analog conversion, frequency up conversion, filtering, amplification and transmission over the communication network 300 via the antenna 170. The receiver 162 and transmitter 166 are coupled to a local oscillators (LOs) 164.

The DSP 172 also provides for receiver and transmitter control. For example, the gains applied to communication signals in the receiver 162 and transmitter 168 may be adaptively controlled through automatic gain control algorithms implemented in the DSP 172.

The first processing subsystem 130 of the portable module 100 preferably includes a microprocessor 132 that controls the overall operation of the portable module. The microprocessor 132 is connected to the first memory subsystem 120 and an input/output subsystem 140. The first memory subsystem 120 comprises a flash memory 122 and a random access memory (RAM) 124. The input/output subsystem 140 comprises a keyboard 142, a display 144, a serial port 146, auxiliary I/O devices 148, a speaker 150 and a microphone 152.

The first communication port 110 may be realized by an infrared device and associated circuits and components, a Bluetooth™ communication module, a surface acoustic wave (SAW) based system, a serial port such as 146, other types of data ports such as Universal Serial Bus (USB) ports, or other information system to provide for communication with similarly-enabled systems and devices. Data transmission and reception may also conform to other known standards, such as IEEE 802.11b, Infrared Data Association (IrDA) infrared, or can be carried out according to a proprietary transmission scheme.

Other device subsystems 180, such as power subsystems, may also be included in the portable module 100.

Operating system software used by the microprocessor 132 are preferably stored in the Flash memory 122 in the first memory subsystem 120. The operating system, specific device applications, or parts thereof, may be temporarily loaded into a volatile memory such as the RAM 124. Received communication signals may also be stored to the Flash memory 122 or the RAM 124.

The microprocessor 132, in addition to its operating system functions, also executes software applications. Applications which control basic device operations, such as data and voice communication applications for example, may be installed on the portable module 100 during manufacture. A user may also install additional applications at a later time.

An exemplary application that may be loaded onto the portable module 100 is a personal information manager (PIM) application that organizes and manages data items relating to e-mail, calendar events, voice mails, appointments, and task items. The PIM application may also send and receive data items through the network 300. In one embodiment, the PIM data items are integrated, synchronized and updated, via the network 300, with corresponding data items stored or associated with a host computer system having access to the network 300.

Further applications may also be loaded onto the portable module 100 through the network 300, the communication port 110, serial port 146, an auxiliary I/O subsystem 148, or any other suitable subsystem 180, for execution by the microprocessor 132.

A communication such as a text message or web page download is processed by the communication subsystem 160 and input to the microprocessor 132, which may further process the received signal for output to the display 144, or alternatively to an auxiliary I/O device 148. A user of the portable module 100 may also compose data items such as email messages using the keyboard 142 in conjunction with the display 144 and possibly an auxiliary I/O device 148. The composed items may then be transmitted over the network 300 through the communication subsystem 160.

For voice communications, the operation of the portable module 100 is substantially similar, except that received signals are output to a speaker 150 and signals for transmission are generated by a microphone 152. Alternative voice or audio I/O subsystems such as a voice message recording subsystem may also be implemented in the portable module 100. Although voice or audio signal output is usually accomplished primarily through the speaker 150, the display 144 may also be used to provide an indication of the identity of a calling party, the duration of a voice or phone call, or other voice or phone call related information for example.

The serial port 146 may be implemented in the portable module 100 for synchronization and communication with a computer or computer peripheral.

Figure 3:
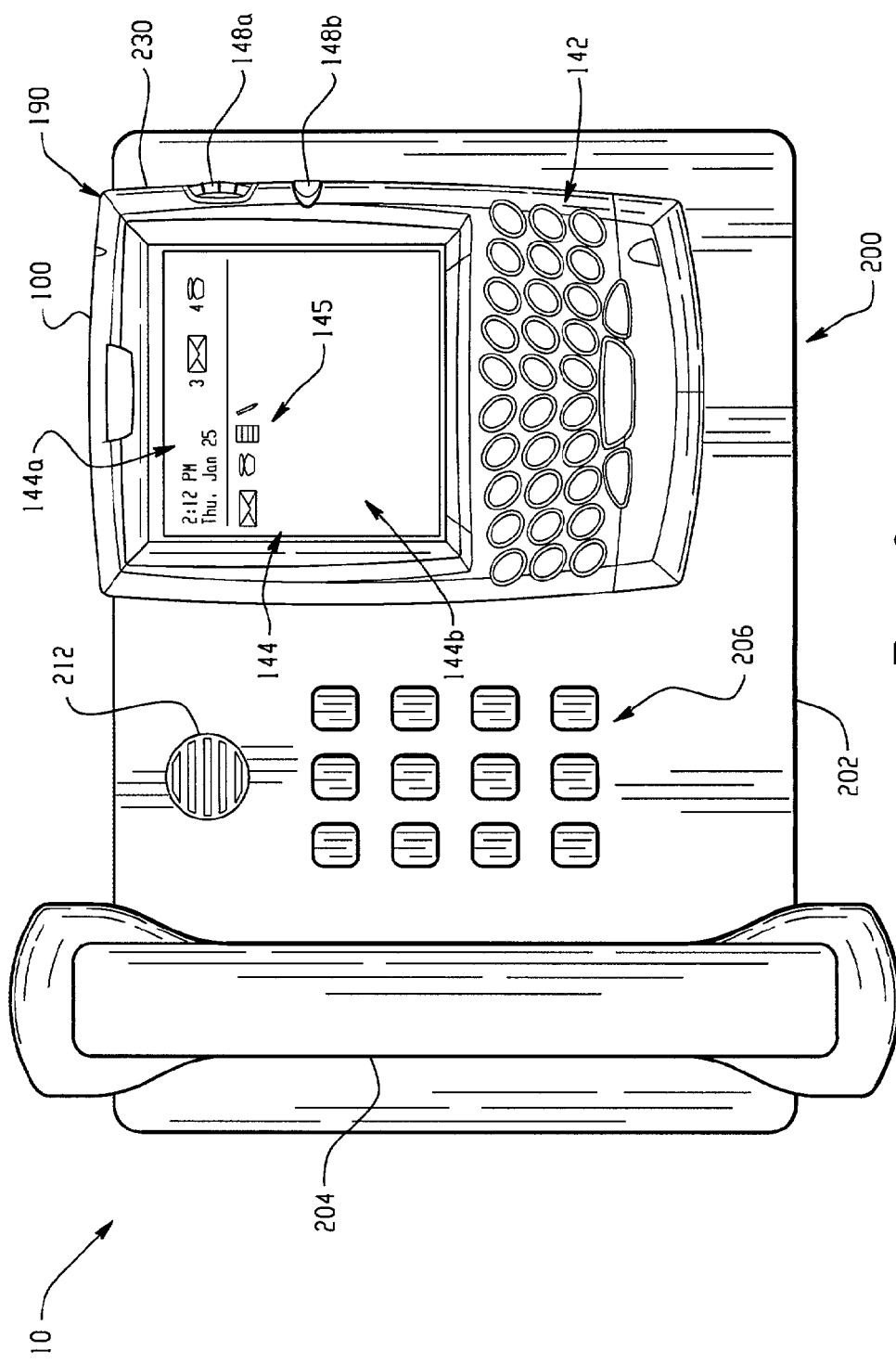
FIG. 3 is a diagram of an information system including a communication module having a receiving portion in the base module for receiving the portable module.
Figure 4:
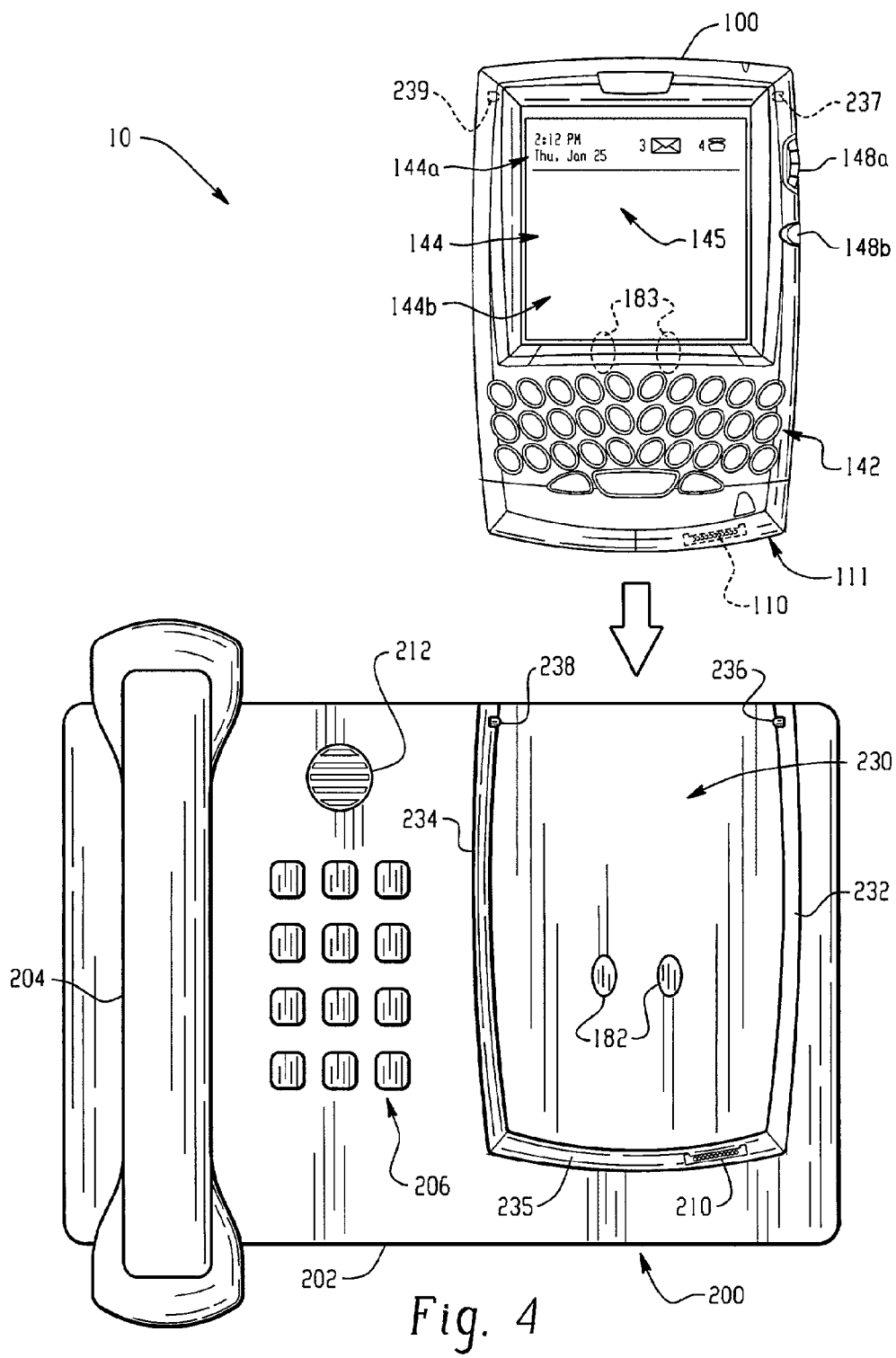
FIG. 4 is a diagram of the information system in which the portable module is removed from the receiving portion.

FIG. 3 is a diagram of an information system 10 including a base module 200 having a receiving portion 230 in which is received a portable module 100. FIG. 4 is a diagram of the information system 10 in which the portable module 100 is removed from the receiving portion 230 of the base module 200. In the illustrative embodiment shown, the base module 200 is a telephone.

The portable module 100 is releasably mountable with the base module 200 in the receiving portion 230. The receiving portion 230 is illustratively a cavity defined by side walls 232 and 234 and bottom wall 235 and is configured to receive the portable module 100. The second communication port 210 is located on the bottom wall 235 of the receiving portion 230, and the first communication port 110 is located in a complementary location on the bottom portion 111 of the portable module 100, as shown in FIG. 4.

When the portable module 100 is received in the receiving portion 230, the first and second communication ports 110 and 210 couple and communication between the ports 110 and 210 is established.

The receiving portion 230 also provides for retention of the portable module 100 in the received position. Side surfaces 232 and 234 of the receiving portion 230 may be contoured so as to engage the sides of the portable module 100 and hold the portable module 100 by friction fit within the receiving portion 230. In addition, one or more surfaces of the receiving portion 230 may carry retention means, such as nubs or protrusions 236 and 238 that engage detents 237 and 239 in the portable module 100, or vice versa, to thereby removably hold the portable module 100 in the receiving portion 230. Other retention means may include other elastically-biased protrusions or hooks on the portable module 100 or the base module 200, co-operating with appropriate mating retention means on the other of the base module 200 or the portable module 100. Alternatively, additional means to maintain the portable module 100 in its mounted position, such as a movable clip arrangement, may be mounted on the base module 200.

Illustratively, the base module 200 may be any standard telephone comprising a base unit 202 having a keypad 206 thereon and a handset 204. The handset 204 and the base unit 202 may be connected via a telephone cord, or may instead form a cordless telephone system in which the handset 204 and base unit 202 communicate via a short-range wireless link. In a cordless telephone, the keypad 206 is often installed on the handset 204 instead of base unit 202. A speaker phone speaker 212 is provided for speakerphone functions. Other telephone sets may also be adapted for operation with a portable module 100 as described in further detail below.

When the portable module 100 is removed from the base module 200 as shown in FIG. 4, both the portable module 100 and base module 200 are independently functional. The portable module 100 functions are operable, and the base module 200 functions are similarly operable. For example, the portable module 100 may be used to send email messages through a wireless network, and the base module 200 may be used to make a telephone call over a telephone network. Any other functions for which the portable module 100 and base module 200 are enabled are also preferably operable when the portable module 100 is detached from the base module 200.

When the portable module 100 is received in the receiving portion 230 of the base module 200, the portable module 100 is in its mounted position. The base module 200 and portable module 100 communicate over the first and second communication ports 110 and 210 to provide interoperation and have access to at least some of the features of each other through interoperation.

The communication ports 110 and 210 may cooperate to form a coupled serial connection, such that the communication port 110 is the device serial port 146 or a USB port, as described above. Alternatively, the communication ports 110 and 210 may be realized using a wireless information system such as infrared, SAW or a Bluetooth module as previously described. When the first and second communication ports 110 and 210 are implemented using a wireless information system, the portable module 100 need not necessarily be in the mounted position shown in FIG. 3 in order to communicate with the base module 200.

An extending portion 190 of the portable module 100 may extend beyond the base module 200 to provide access to a part of the portable module 100 for removal thereof from the receiving portion 230. The extending portion 190 allows a user to grasp the top of the portable module 100 and remove it from its mounted position. The retention means described above are preferably adapted to apply a retaining force sufficient to retain the portable module 100 in its received position, while allowing a user to easily remove the portable module 100.

When the portable module 100 is in a mounted position, power terminals 182 may provide operational power to the portable module 100 and may further recharge a rechargeable power source in the portable module 100. The power terminals 182 are located in the receiving portion 230 so that they are operatively associated with power terminals 183 located on the bottom surface of the portable module 100. The base module 200 incorporates appropriate conversion and control circuitry, operatively connected to its power source and the power terminals 182 to provide for recharging of a power source in the portable module 100. A rechargeable power source in the portable module 100 may thereby be recharged from the power source of the base module 200 by placing the portable module 100 in its mounted position.

The charging conversion and control circuitry may be installed in the portable module 100 instead of the base module 200, or partly in the portable module 100 and the base module 200. The power terminal 182 and 183 have associated circuitry, physical features, or both, to prevent discharging of the respective power sources to which they are connected or damage to internal components caused by external contact with the terminals. Illustratively, the power terminals 182 and 183 may be designed to impart a physical displacement to each other such that displacement of the power terminals 182 and 183 is necessary to provide electrical contact between them and the internal components of the base module 200 and the portable module 100. The displacement is induced when the portable module 100 is in a mounted position.

In an alternative embodiment, the power terminals 182 and 183 are incorporated into communication ports 210 and 110, respectively.

When the power source of the portable module 100 is discharged to such an extent that the portable module 100 is inoperative, the portable module 100 may be configured to be fully operational while in its mounted position as the base module 200 serves as a power source through the connection of power terminals 182 and 183. This provides for operation of the portable module 100 during charging of the portable module 100 power source, even when the power source in the portable module 100 is incapable of supplying sufficient power for operation of the portable module 100.

Another embodiment information system 10 includes a portable module 100 having a non-rechargeable power source. In the mounted position, the portable module 100 bypasses its internal power source and receives power from power terminals 182 and 183, thus extending the life of the non-rechargeable source, or enabling the portable module 100 to operate when its non-rechargeable source is depleted.

The nature and extent of the interoperation between the portable module 100 and the base module 200 when communicating over the first and second communication ports 110 and 210 will depend upon the particular devices comprising the portable module 100 and the base module 200. In the exemplary information system 10 shown in FIGS. 3 and 4, the base module 200 may comprise a second processing subsystem 240 and a second memory subsystem 220 (FIG. 1) to provide for storage and retrieval of contact information, such as caller ID and contact telephone numbers. Similarly, the portable module 100 may also provide for storage and retrieval of contact information in the first memory subsystem 120 (FIGS. 1 and 2). Certain fields of contact information, such as contact name, title, address and telephone number may be common to the contact information stored in the portable module 100 and the base module 200.

New or updated contact information may be readily transferred between the base module 200 and the portable module 100. Thus, the user need not update the portable module 100 and the base module 200 separately. The information transfer may be automatically invoked when the portable module 100 is received in the receiving portion 230 of the base module 200. Alternatively, the information transfer may be manually invoked by depressing a key or key sequence on the keypad 206 of the base module 200 or the keyboard 142 of the portable module 100. An auxiliary input device 148 may also be used to selectively transfer information, such as a thumbwheel 148*a* or auxiliary function key 148*b* shown in FIG. 3.

When a contact information transfer is initiated, automatically or manually, either the base module 200 or portable module 100 may determine whether the contact information should be updated according to an update scheme. For example, software in the base module 200 and the portable module 100 may be configured to recognize either the base module 200 or the portable module 100 as a master module that takes precedence in an update operation. Alternatively, updates may be performed on the basis of the time an update is made, manual selection of one of the updates by a user, or by other update schemes. Stored contact information and associated update software and algorithms may be adapted to implement a desired update scheme. If contact information has not changed on the portable module 100 or the base module 200 since the portable module 100 was last placed in its mounted position, then no updating of contact information between the portable module 100 and the base module 200 will be required.

Contact information may also be entered or updated in the second memory subsystem 220 on the base module 200 or the first memory subsystem 120 of the portable module 100 when the portable module 100 is in its mounted position. Furthermore, contact information entered into the portable module 100 when it is in a mounted position may also be stored in the base module 200, and vice versa. When the addition or updating of contact information has been completed, a contact information transfer operation may be invoked either manually or automatically and may proceed substantially as described above to migrate any changes or new information between the portable module 100 and the base module 200.

Another embodiment of the information system 10 has a single contact information database maintained in the first memory subsystem 120 of the portable module 100. When the portable module 100 is in its mounted position, contact information may be stored in the first memory subsystem 120 of the portable module 100 using either the device keyboard 142, auxiliary inputs 148a, 148b, telephone set keypad 206 or some combination thereof. The base module 200 has access to the contact information stored in the first memory subsystem 120 of the portable module 100 when the module is in its mounted position.

In another embodiment of the information system 10, the base module 200 may place a phone call based on contact information selected by the portable module 100. A user may wish to place a phone call to a contact whose information is stored in the portable module 100. Once the information for a particular contact is selected on the portable module 100, the user may initiate a telephone call from the base module 200 using the mounted portable module 100 instead of having to manually dial the telephone number using the keypad 206.

Figure 5:
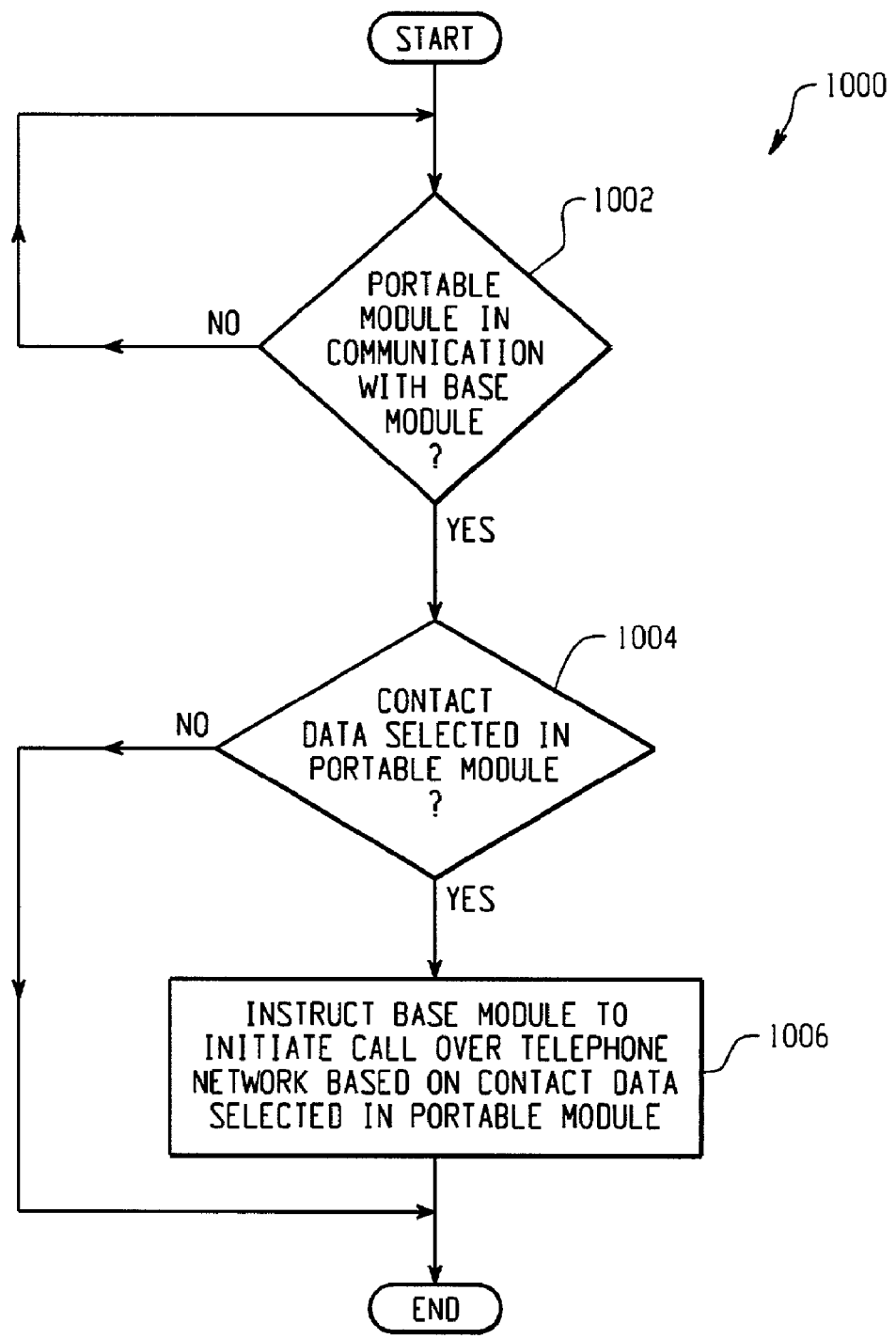
FIG. 5 is a flow diagram illustrating a process of placing a phone call based on selected contact data.

FIG. 5 provides a flow diagram 1000 illustrating a process of placing a phone call based on selected contact data. In step 1002, the information system 10 determines if the portable module 100 has established communication with the base module 200 over the first and second communication ports 110 and 210. If communication has been established, the system 10 determines if contact data is selected in the portable module 100, as shown in step 1004. If contact data is selected, the system 10 instructs the base module 200 to initiate a phone call over a telephone network based on the contact data selected in the portable module 100. Thus, when the portable module 100 is in its mounted position, a user may place calls from the base module 200 to a particular contact simply by selecting the particular contact information in the portable module 100.

Stored information management and call placement are exemplary functions for which interoperation between the portable module 100 and the base module 200 may be desired. Interoperation may also provide for shared information display. For example, in the system shown in FIGS. 3 and 4, the base module 200 does not include a display screen. However, when the portable module 100 is placed in its mounted position, the portable module display 144 interfaces with base module 200 and is preferably operable to display telephone-related information, such as caller identification, and thereby expand the functionality of the base module 200.

The portable module display 144 may display date and time indicators as shown in FIGS. 3 and 4, and also may display further icons and indicators, generally designated by the reference character 145, dependent upon the functions or resources available. The portable module display 144 may also display appropriate function menus indicating functions available to the portable module 100.

When removed from the base module 200, the portable module 100 is operable to perform only portable module 100 functions 102. However, when the portable module 100 is in its mounted position and in communication with the base module 200 via the communication ports 110 and 210, the portable module 100 has access to functions 202 supported by the base module 200 as previously described. The displayed icons and/or menus in portable module display 144 may reflect the availability of functions 202 which may be invoked or accessed by the portable module 100.

When the portable module display 144 is used to display base module 200 information, any of several different display driving schemes may be implemented. The portable module 100 and base module 200 may be configured such that the base module 200 controls the portable module display 144 when the portable module 100 is placed in its mounted position. Alternatively, drivers for the portable module display 144 may allow separate areas of the display 144 to be dedicated to portable module 100 information and base module 200 information. An upper region 144a of the portable module display 144 may be dedicated to portable module 100 information and functions, and a lower region 144b of the portable module display 144 is dedicated to the base module 200 information. When the portable module 100 is removed from the receiving portion 230, as shown in FIG. 4, the icons and indicators 145 for the base module 200 are no longer displayed, as the portable module 100 is no longer in communication with the base module 200.

In an alternative embodiment, the icons and indicators 145 for the base module 200 are available when the portable module 100 is not in communication with the base module 200. Thus, the user is provided access to data received from the base module 200 and stored in the first memory subsystem 120. However, some functions 202 of the base module 200 may not be available, as the portable module 100 is not in communication with the base module 200. Icons or indicators 145 for unavailable functions may be shaded to indicate the functions are not available, or may not be displayed.

Automatic display control switching may also be implemented. For example, the portable module display 144 may default to the base module 200 display when the portable module 100 is in its mounted position. Invoking a portable module function 102 may then cause the portable module display 144 to display information for such portable module functions 102 when the portable module 100 is in its mounted position.

Figure 6:
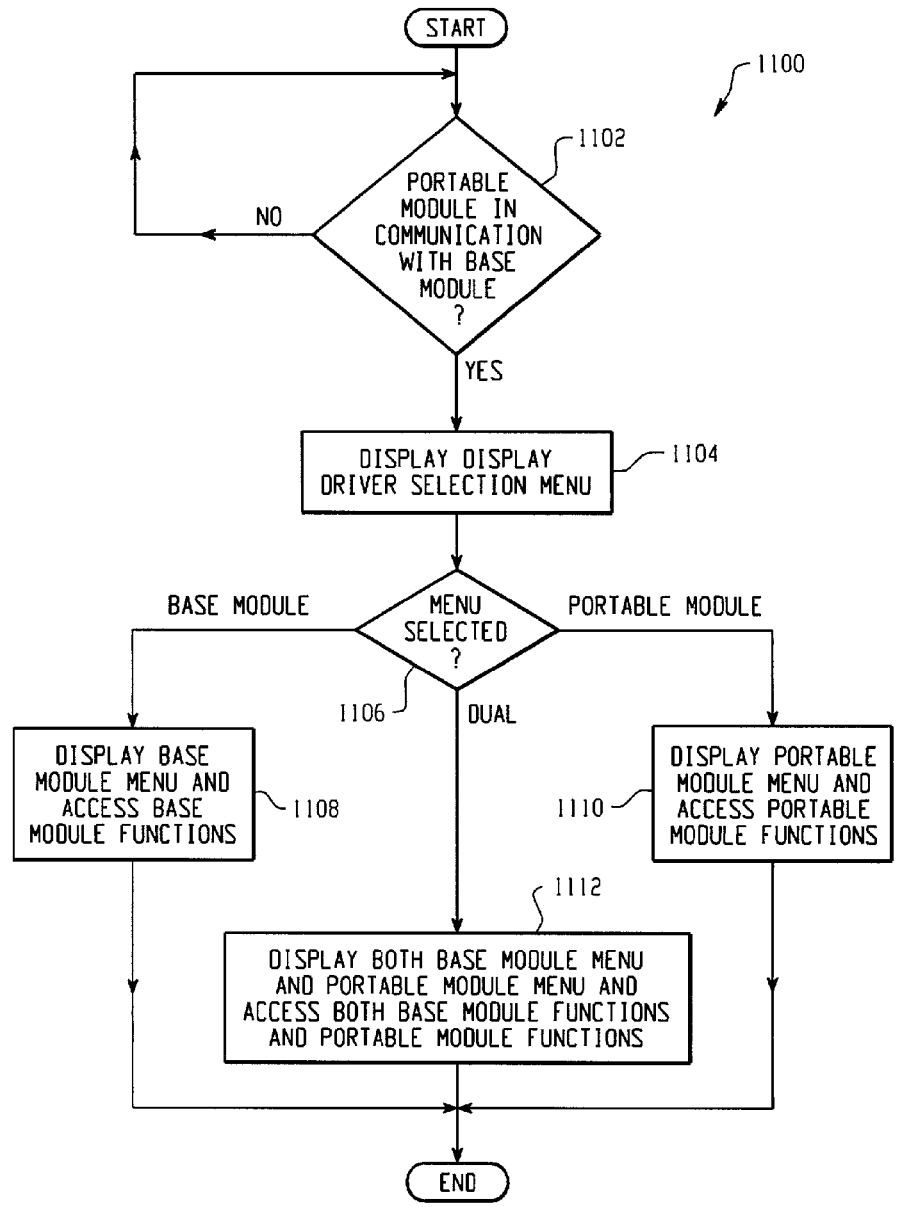
FIG. 6 is a flow diagram illustrating a multiple display driver menu selection.

Manual control switching that allows a user to select whether the base module 200 or portable module 100 controls the portable module display 144 is a further alternative. FIG. 6 provides a flow diagram 1100 illustrating a multiple display driver menu selection. In step 1102, the information system 10 determines if the portable module 100 has established communication with the base module 200 over the first and second communication ports 110 and 210. If communication has been established, then the system 10 displays a display driver selection menu in the portable module display 144, as shown in step 1104.

In step 1106, the user determines whether the portable module display 144 will display base module functions 202 or information, portable module functions 102 or information, or both base module functions 202 or information and portable module functions 102 or information.

If the base module menu is selected, then the portable module display 144 displays information related to the base module 200, including for example information related to base module functions 202, as shown in step 1108.

If the portable module menu is selected, then the portable module display 144 displays information related to the portable module 100 and its functions 102, as shown in step 1110.

If both menus are selected, then the portable module display 144 displays information related to both the portable module 100, the base module 200, and/or their respective functions 102 and 202, as shown in step 1112.

Figure 7:
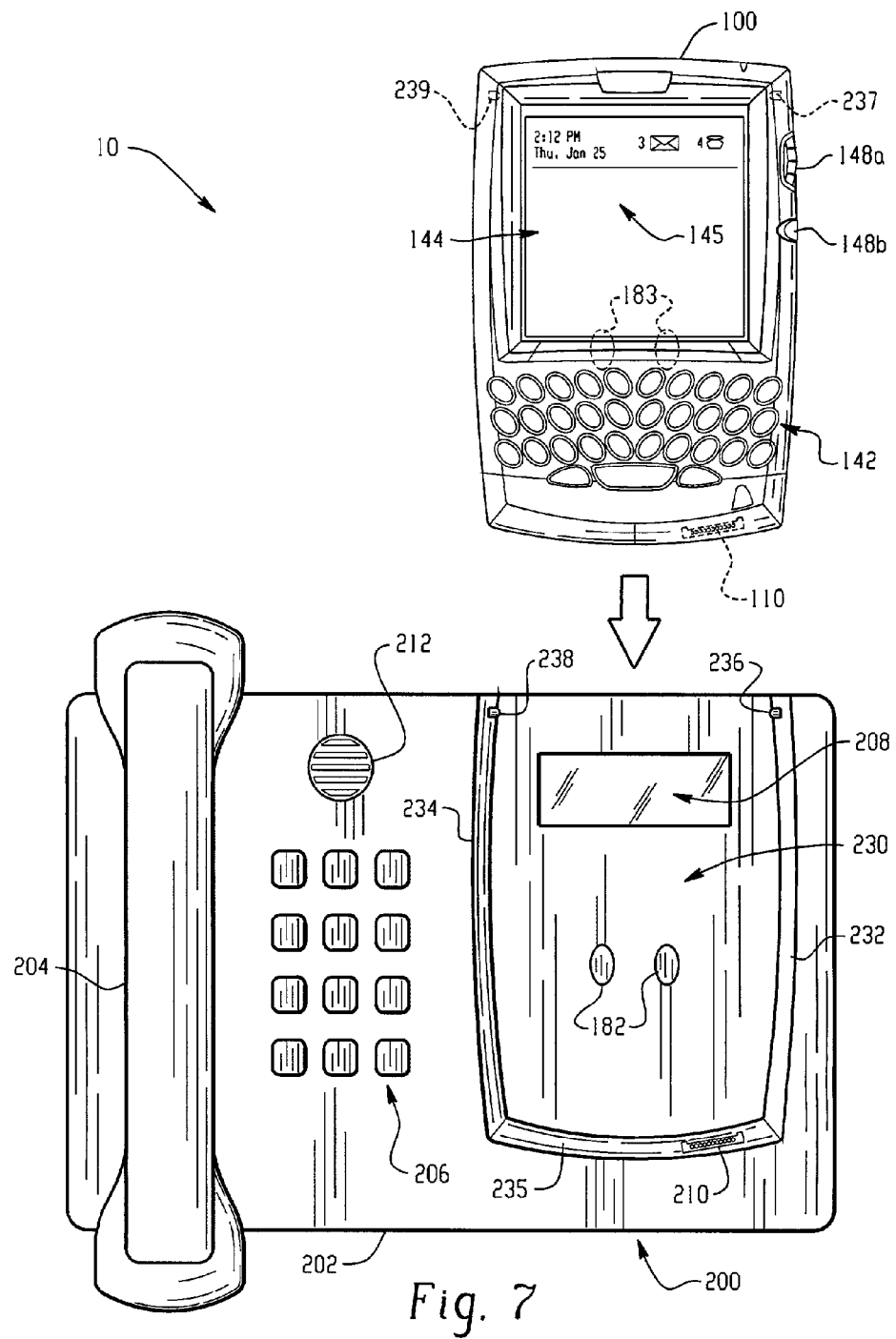
FIG. 7 is a diagram of another embodiment of the information system in which a portable module display supersedes a base module display.

Display sharing schemes may also be used where the base module 200 has its own display. FIG. 7 provides a diagram of another embodiment of the information system 10 in which the portable module display 144 supersedes a base module display 208. The base module display 208 may be used to display limited information, such as a calling telephone number, whereas additional information such as caller name and call duration may be displayed on the portable module display 144 when the portable module 100 is in its mounted position. If the base module display 208 will be used only when the portable module 100 is not in its mounted position, then the base module display 208 may be positioned very close to or within an area occupied by the portable module 100 when the portable module 100 is in its mounted position, thereby reducing the amount of additional space required to accommodate the portable module 100.

Figure 8:
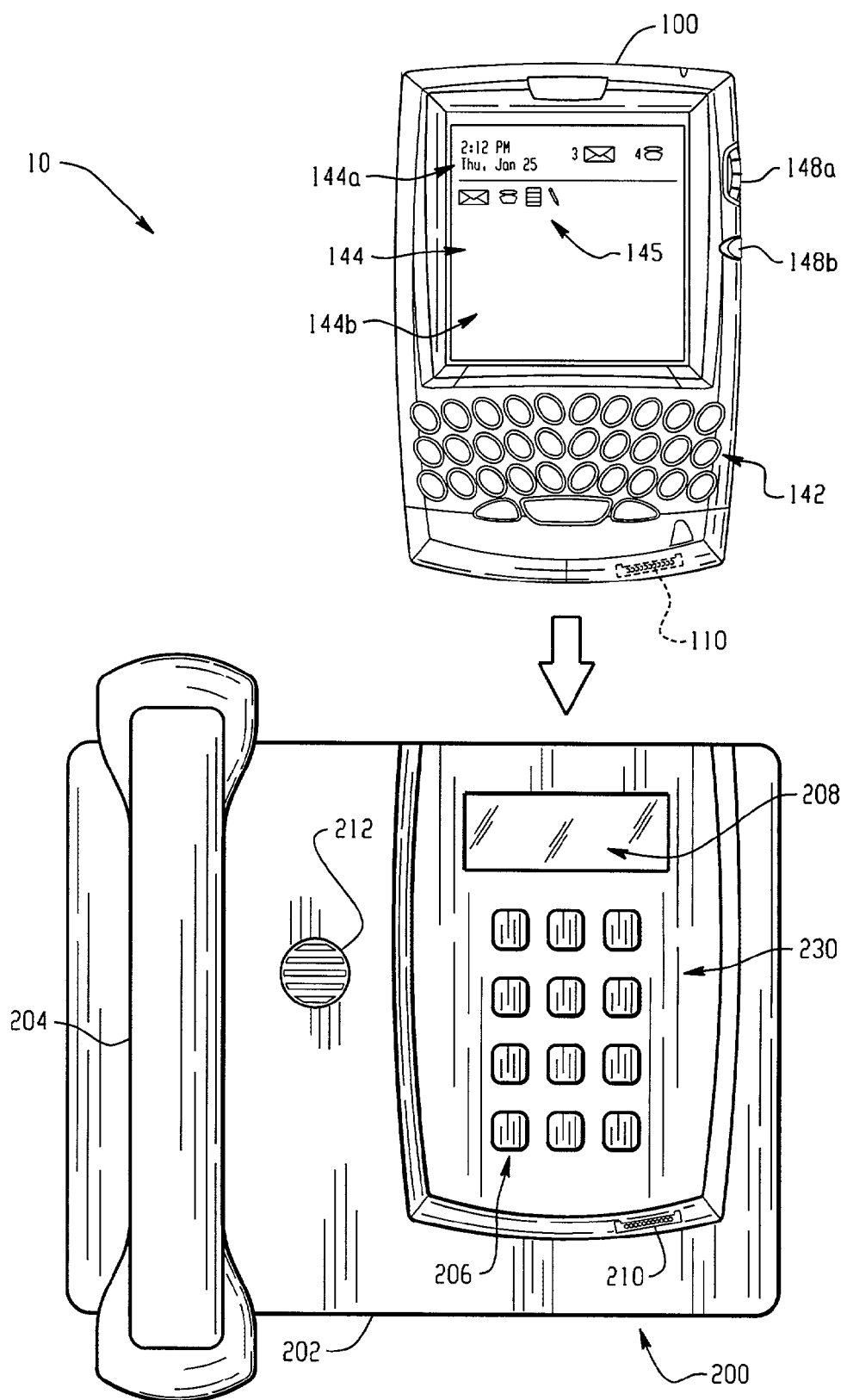
FIG. 8 is a diagram of another embodiment of the information system in which a portable module display and keypad supersede a base module display and keypad.

FIG. 8 is a diagram of another embodiment of the information system 10 in which the portable module display 144 and keypad 142 supersede the base module keypad 206 and display 208. Thus, the amount of additional space required to accommodate the portable module 100 is further reduced.

Figure 9:
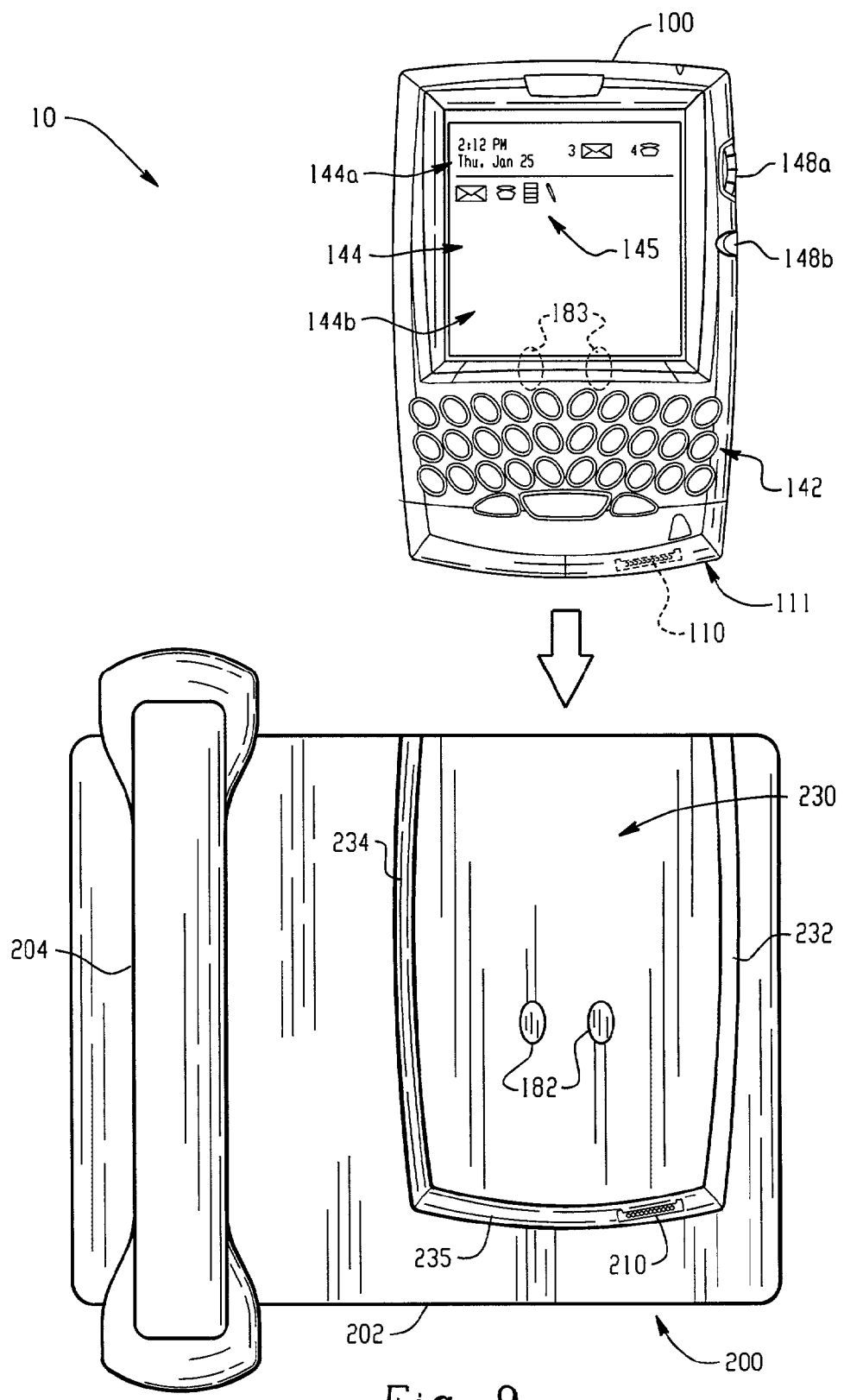
FIG. 9 is a diagram of another embodiment of the information system in which the portable module includes a display and keypad for the base module.

FIG. 9 is a diagram of another embodiment of the information system 10 in which the portable module 100 includes a display 144 and keypad 142 for the base module 200. The base module 200 is inoperable when not in communication with the portable module 100. Alternatively, the base module 200 may be able to perform limited functions when not in communication with the portable module 100, such as receiving and answering telephone calls. In a further alternative embodiment, the receiver 204 of the base module 200 may include a keypad and possibly a display, such that the base module may be fully operational when not in communication with the portable module 100.

Figure 10:
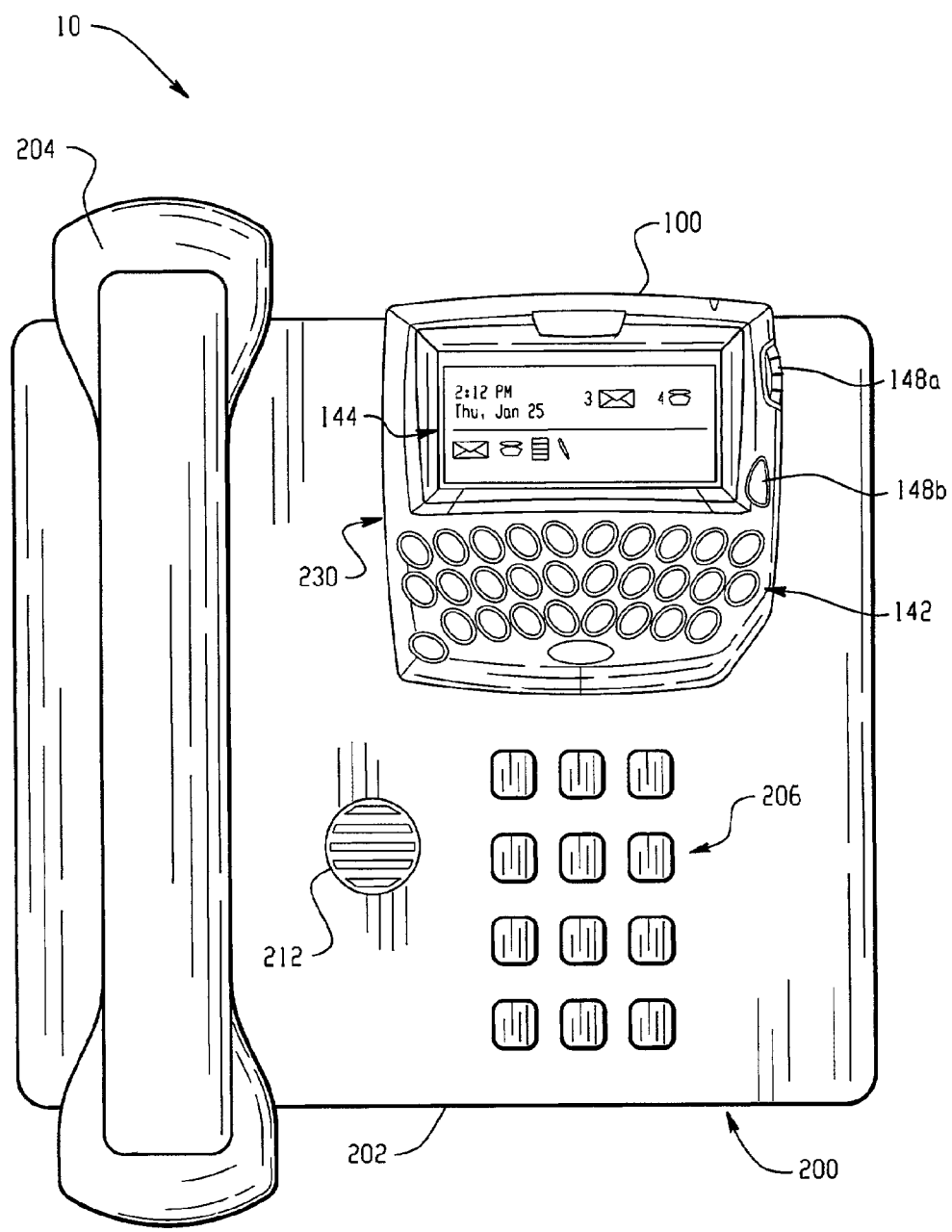
FIG. 10 is a diagram of another embodiment of the information system wherein the portable module includes a display for the base module.

FIG. 10 is a diagram of another embodiment of the information system 10 wherein the portable module 100 includes a display for the base module 200. In this embodiment, the portable module 100 is a small, pager-sized device adapted for mounting on the base module 200. A base module display 208 may also be located beneath the portable module 100, in the receiving portion 230, as described with reference to FIG. 7.

Illustratively, if the portable module 100 is a paging device, the base module 200 is operable to return a call received by the portable module 100 when the portable module 100 is in its mounted position. The call may be returned automatically or upon manual initiation by the user. Thus, the portable module 100 and the base module 200 interoperate to return calls to pages received by the portable module 100.

In addition to contact data, other information stored in the base module 200 or portable module 100 may be similarly transferred via the communication ports 110 and 210. For example, a user may wish to transfer lists of recent callers and recently called telephone numbers stored in the base module 200 to the portable module 100. The user may access the list to return missed calls and redial telephone numbers for calls that may not have been completed or answered. If the portable module 100 is a device enabled for voice communications, such as a cellular telephone, recent calls may be returned or redialed using the portable module 100. Of course, missed call data from a cellular telephone may also be transferred to the base module 200 and calls may then be returned from the base module 200 over a telephone network.

Figure 11:
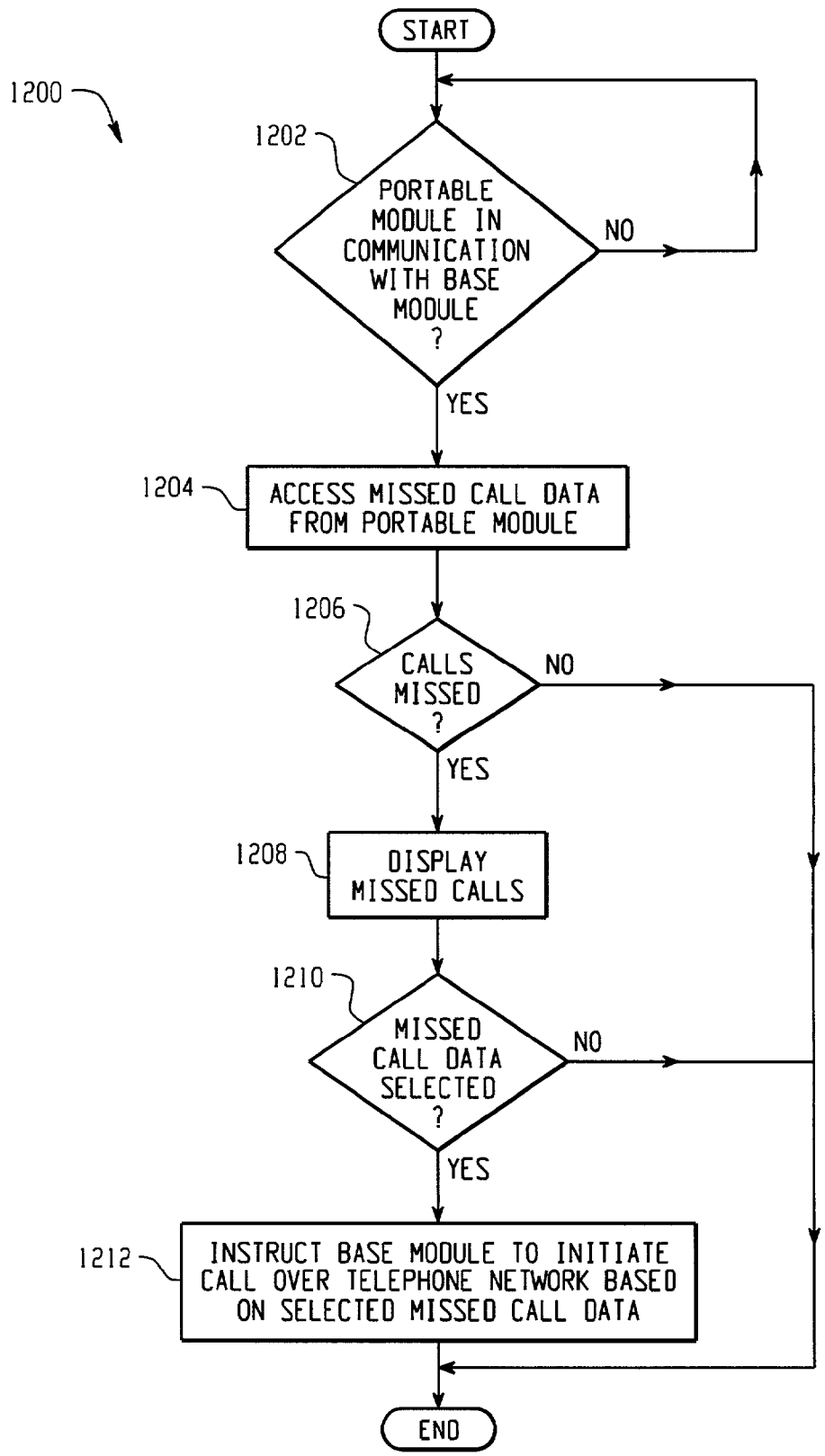
FIG. 11 is a flow diagram illustrating the process of initiating calls based on missed call data received from the portable module.

FIG. 11 provides a flow diagram 1200 illustrating the process of initiating calls based on missed call data from the portable module 100. Illustratively, the portable module 100 is a cellular telephone, and the missed call data relates to unanswered calls to the cellular telephone. In step 1202, the information system 10 determines if the portable module 100 has established communication with the base module 200 over the first and second communication ports 110 and 210. If communication has been established, the system 10 accesses missed call data from the portable module 100, as shown in step 1204.

If the missed call data indicates that calls have been missed on the portable module 100 in step 1206, then the missed calls are displayed on the portable module display 144 or the communication module display 208, as shown in step 1208.

If the user selects a missed call in step 1210, then the base module 200 is instructed to initiate a call over a telephone network based on the missed call data, as shown in step 1212. Thus, if a user inadvertently leaves a cellular phone switched off, or is otherwise prevented from receiving calls on a cellular phone, then the missed calls may be conveniently and quickly returned from a standard telephone.

If the portable module 100 is not capable of voice communications, then transferring the caller and redial lists to the portable module 100 allows the user to retrieve the telephone numbers from the portable module 100 even when the base module 200 is not immediately accessible, and thereby allows the user to redial and return calls from another telephone.

Transfers of caller and redial lists, as well as other additional information, between the portable module 100 and base module 200 may be invoked either manually by a user or automatically when the portable module 100 establishes communication with the base module 200.

Figure 12:
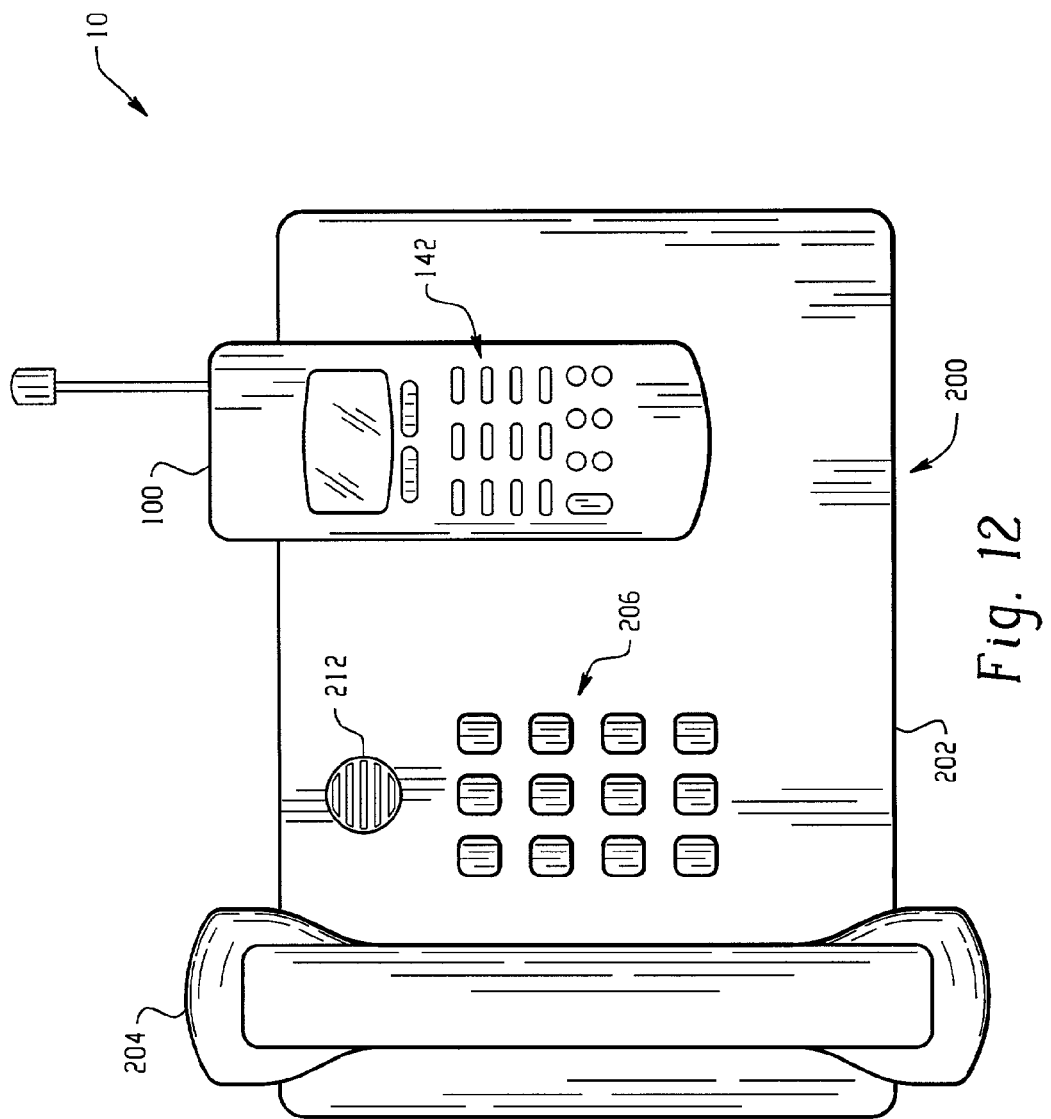
FIG. 12 is a diagram of another embodiment of the information system wherein the portable module is a cellular telephone and the base module is a telephone.

As described above, the portable module 100 may be enabled for voice communications. When a user has both a voice-enabled portable module 100, such as a cellular telephone, and a voice-enabled base module 200, such as a telephone, as shown in FIG. 12, there are normally different phone numbers assigned to the portable module 100 and base module 200. A caller attempting to place a call to such a user normally has no knowledge of the location of the user and may often dial the portable module 100 phone number instead of the phone number for the base module 200, simply because the user may be more likely to answer a call to the portable module 100 than the base module 200.

Figure 13:
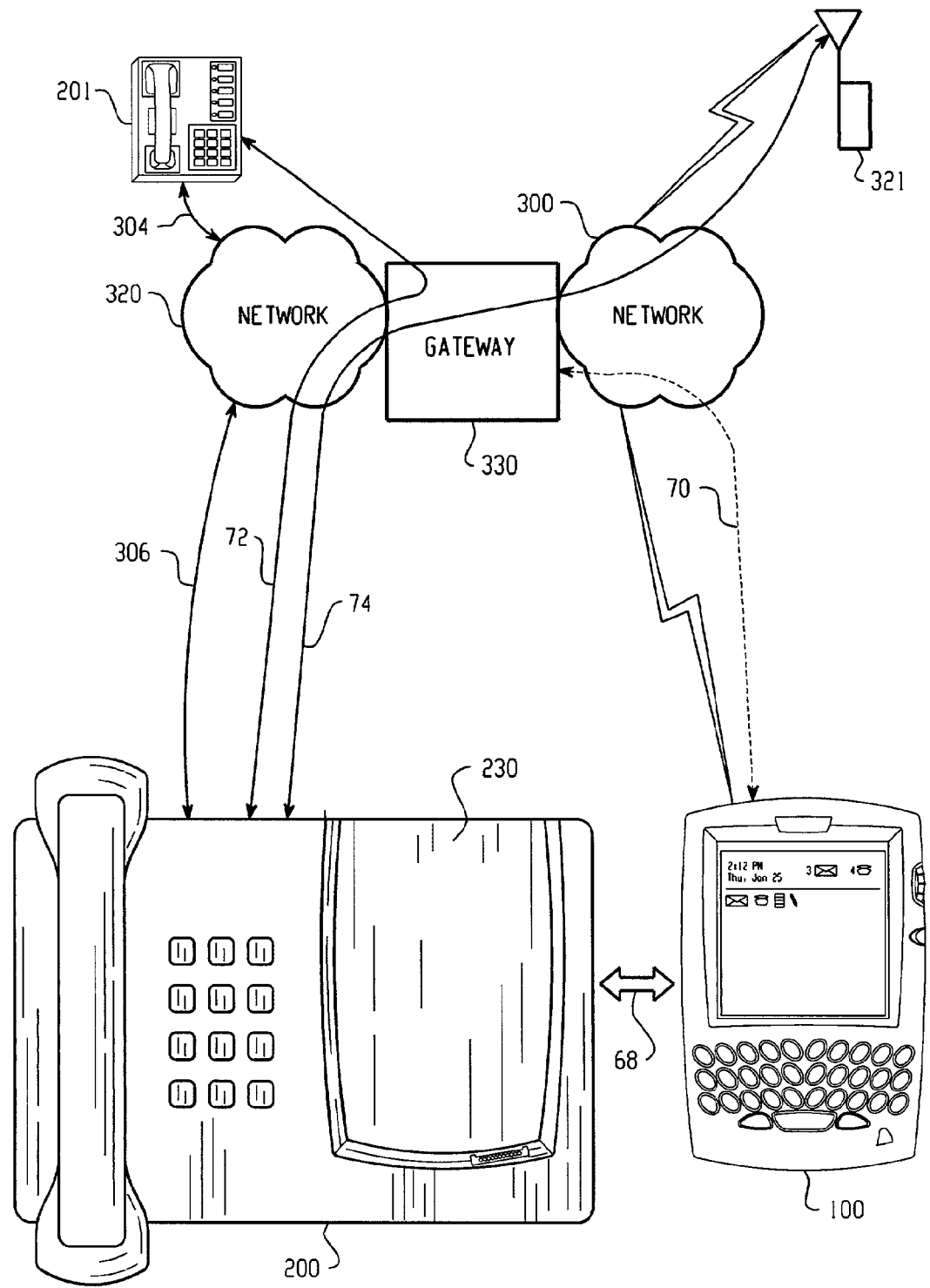
FIG. 13 is a diagram illustrating call routing from a portable module to a base module.

FIG. 13 provides a diagram illustrating call routing from the portable module 100 to the base module 200 to avoid airtime usage for calls to the portable module 100. Illustratively, the portable module 100 is a communication device that receives phone calls over a wireless network 300, and the base module 200 is a telephone that communicates over a telephone network 320. The telephone network 320 and the wireless network 300 communicate through a gateway 330. The base module 200 and caller equipment 201 are connected to the telephone network 320 via links 304 and 306, respectively. The links 304 and 306 will typically be hardwired conductor or optical links, but may also include wireless communication links to the telephone network 320. The portable module 100 and a communication device 321 communicate over the wireless network 300 through wireless links. The gateway 330 is a system through which calls to the portable module 100 and possibly other communication devices enter and are routed through the network 300. Although shown in FIG. 12 as linking the telephone network 320 and the wireless communication network 300, the gateway 330 may be implemented in either of these networks. Other intervening networks may also be used.

When the portable module 100 is placed in its mounted position, as indicated in FIG. 13 by the double arrow 68, a control message 70 is sent to the network 300. The control message 70 may then be forwarded to the gateway 330 or a network service provider that operates the gateway 330 and/or network 300. In response to the control message 70, any subsequent incoming calls over the wireless network 300 for the portable module 100 are routed over the telephone network 320 to the base module 200. The routing includes both calls placed over the telephone network 320, as indicated by arrow 72, and calls placed over the wireless network 300, as indicated by arrow 74. As long as the portable module 100 remains in its mounted position, the incoming calls to the portable module 100 will continue to be routed over the telephone network 320.

Figure 14:
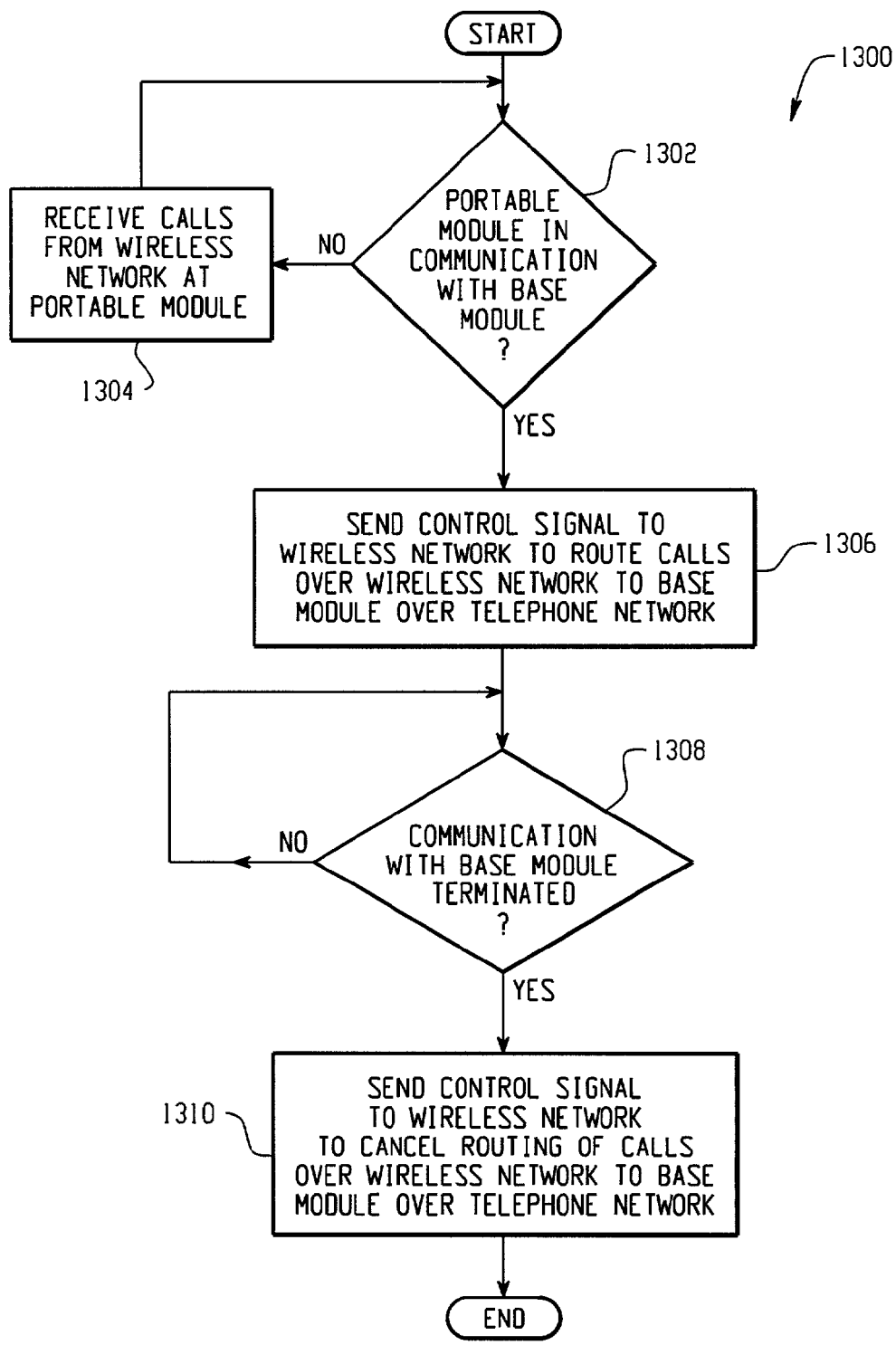
FIG. 14 is a flow diagram illustrating a process of routing calls placed to a wireless network to a telephone network.

FIG. 14 provides a flow diagram 1300 illustrating a process of routing calls placed to a wireless network 300 to a telephone network 320. In step 1302, the information system 10 determines if the portable module 100 has established communication with the base module 200 over the first and second communication ports 110 and 210. If communication has not been established, then calls to the portable module 100 are received over the wireless network 300, as shown in step 1304. If communication has been established, however, then a control signal 70 is sent to the wireless network 300 to route calls over the wireless network 300 to the base module 200 over the telephone network 320, as shown in step 1306.

The call routing of step 1306 continues until the system 10 detects that the communication between the portable module 100 and the base module 200 over the first and second communication ports 110 and 210 is terminated, as shown in step 1308. Upon communication termination, another control signal 70 is sent to the wireless network 300 to cancel the routing of calls over the wireless network 300 to the base module 200 over the telephone network 320, as shown in step 1310.

In a similar manner, the base module 200 may also be configured to route calls to the portable module 100 unless the portable module 100 is in its mounted position. These two routing schemes may be further combined so that calls to the portable module 100 will automatically be routed to the base module 200 when the portable module 100 is in its mounted position, and calls to the base module 200 will automatically be routed to the portable module 100 when the portable module 100 is detached.

Furthermore, a user may configure the portable module 100 and base module 200 to automate re-routing functions as desired. Illustratively, if the base module 200 is a user's business telephone, the user may configure the base module 200 to route calls to the portable module 100 only during the user's morning and evening commute times. Thus, should the user receive a business call to the base module 200 when the user is travelling to or from work, the user may answer the call on the portable module 100.

A user may also override any automatic re-routing, using either the portable module 100 or base module 200 I/O devices. Illustratively, if a user's base module 200 is a business telephone, the user may be able to override automatic call re-routing to the portable module 100 in such situations as when the portable module 100 is lost or the user is at the office but is not in possession of the portable module 100.

When the portable module 100 is detached from the base module 200 or a user wishes to override call re-routing, another control message is sent to the gateway 330 or a network service provider to terminate the call re-routing. The portable module 100 and base module 200 are then operable to make and receive calls separately.

The information system 10 also provides for handing off to the base module 200 a call that is in progress to the portable module 100 when the portable module 100 is placed in its mounted position. If a user has a call in progress to the portable module 100 when approaching the vicinity of the base module 200, the user may desire to proceed with the call using the base module 200 instead of the portable module 100.

Figure 15:
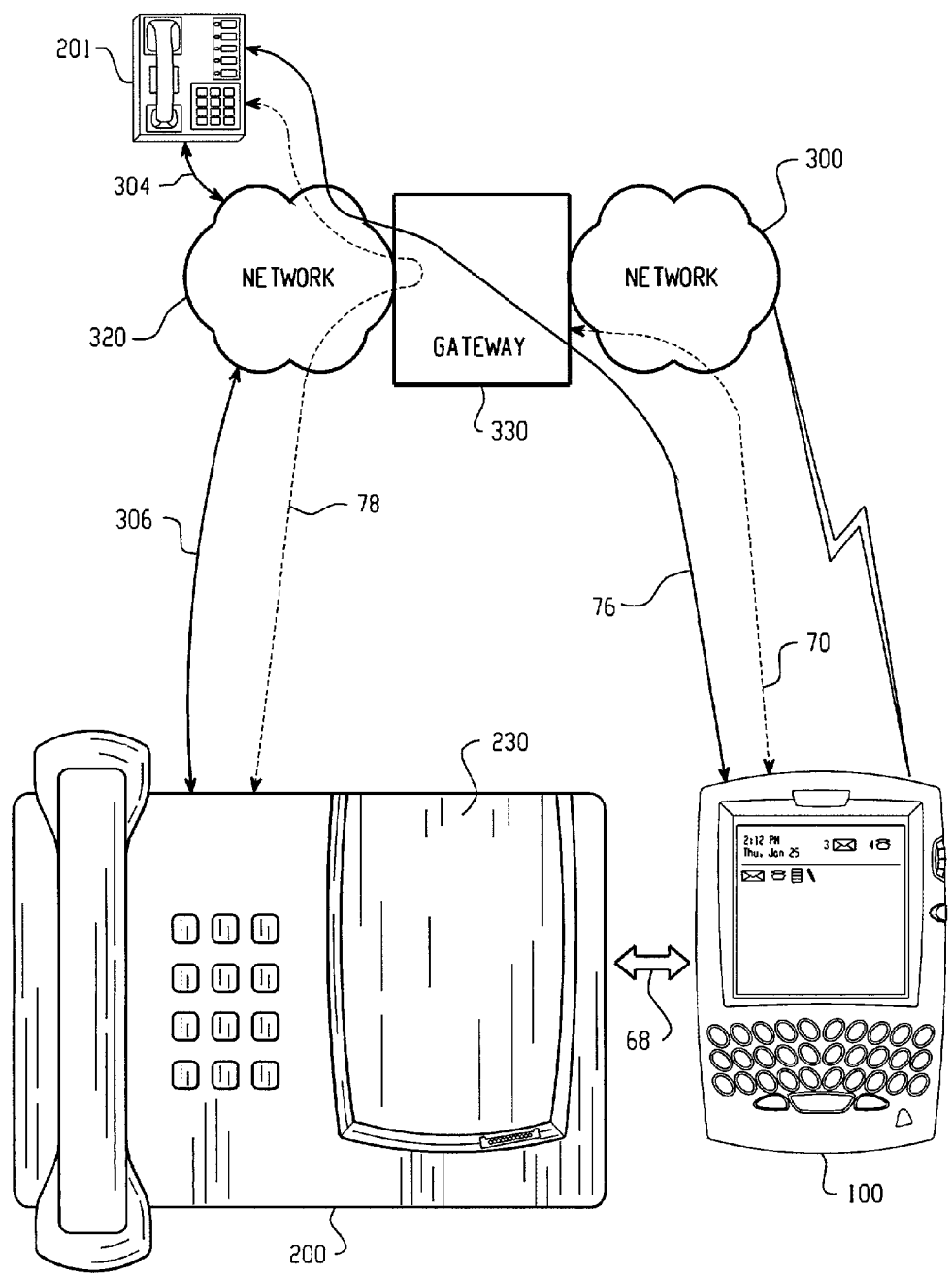
FIG. 15 is a diagram illustrating call handoff from a portable module to a base module.

Rather than terminating the existing call and re-establishing the call through the base module 200, a handoff may be accomplished to transfer the call from the portable module 100 to the base module 200. FIG. 15 is a diagram illustrating call handoff from the portable module 100 to a base module 200. A call in progress to the portable module 100 is indicated by arrow 76. When the user places the portable module 100 in its mounted position as indicated by double arrow 68, a control message 70 is sent to the network 300. The control message 70 may then be forwarded to the gateway 330 or a network service provider that operates the gateway 330 and/or network 300. The gateway 330 or the network 300 then routes the call 76 to the base module 200 through the telephone network 320 instead of to the portable module 100 through the wireless communication network 300 as long as the portable module 100 remains in its mounted position.

The routing of call 76 through the telephone network 320, as indicated by arrow 78, is accomplished by the gateway 330 in communication with the wireless network 300. The call 76 is maintained until the call connection 78 is established. When the call 78 is established, the mobile network call 76 may be terminated. Accordingly, the calling or called party is not required to perform any call transfer or redial operations to connect with the base module 200 to continue the call. Furthermore, when the portable module 100 is placed in its mounted position, the user may immediately continue a call 76 to the portable module 100 using the base module 200. However, the call to the portable module 100 continues over the wireless network 300. The portable module 100 communicates with the base module 200 over the first and second communication ports 110 and 210 to facilitate the use of the handset 204 for voice communications via the portable module 100. The handset is then effectively an auxiliary I/O device 148 that is used instead of the module speaker 150 and microphone 150 to continue the call. Once the re-routed call 78 is connected over the telephone network 320 to the base module 200, the call to the portable module 100 is terminated.

In another embodiment, when the portable module 100 is placed in its mounted position, the user may immediately continue a call to the portable module 100 using the base module 200. However, the call to the portable module 100 remains over the wireless network 300 and is not re-routed. The portable module 100 communicates with the base module 200 over the first and second communication ports 110 and 210 to facilitate the use of the handset 204 for voice communications via the portable module 100. The handset is then effectively an auxiliary I/O device 148 that is used instead of the module speaker 150 and microphone 150 to continue the call.

Figure 16:
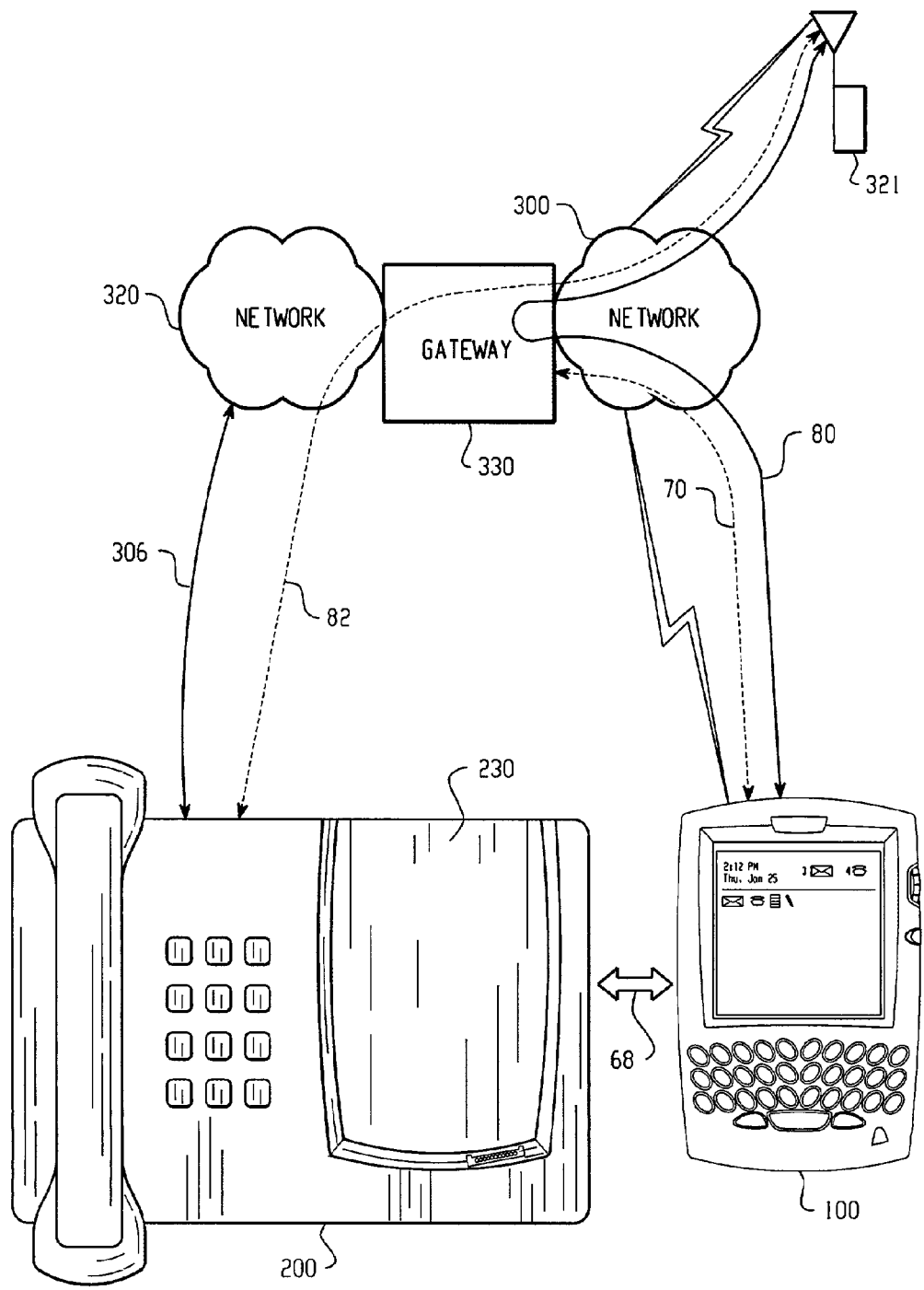
FIG. 16 is a diagram illustrating call handoff from a portable module to a base module, wherein the call is placed form a mobile communication device.

FIG. 16 is a diagram illustrating call handoff from a portable module 100 to a base module 200, wherein the call is placed form a mobile communication device 321. The overall handoff process is substantially as described above. However, when the call 80 is between two wireless communication devices communicating over the wireless network 300, it may be necessary to transmit a control message to other wireless network 300 components instead of or in addition to the gateway 330 in order to establish the new call connection 82 to the base module 200 through the telephone network 320. A call handoff for a wireless communication device to another wireless communication device will be adapted to the particular wireless network 300 through which the call is routed.

When a call is in progress on the base module 200 and the portable module 100 in its mounted position, detachment of the portable module 100 may initiate a handoff from the base module 200 to the portable module 100, substantially as described above. A control message may be sent from either the base module 200 or portable module 100 to the network 300 or gateway 330 or other communications equipment in the telephone network 320 to establish a new call connection through the wireless network 300 to the portable module 100. This function, like those described above, may be configured for automatic or manual execution.

Even when the portable module 100 is not enabled for voice or audio functions, voice or audio related functions of the base module 200 may still be accessible to and usable by the portable module 100 when the portable module 100 is in its mounted position. For example, if the portable module 100 is a mobile e-mail messaging device adapted for receiving e-mail messages and attachments, the user may receive voice or audio items such as sound file attachments to the e-mail messages at the portable module 100. When a user's voice-mail system is integrated with or operates in conjunction with an e-mail system such that voicemail messages appear in the user's e-mail inbox, voicemail messages may also be received at the portable module 100.

When the portable module 100 is mounted on the base module 200, and thus in communication with the base module 200 over communication ports 110 and 210, a speaker in the handset 204 or an auxiliary speaker phone speaker 212 or other handsfree accessory connected to the base module 200 provides an audio playback feature. An audio file, voicemail message or incoming internet audio content may be transferred from the portable module 100 to the base module 200 or otherwise made accessible to the base module 200 for audio playback. Playback of a voicemail message from the portable module 100 through the base module 200 allows a user to access and listen to voicemail messages without having to call a voicemail system. The audio playback also enhances Internet browsing on the portable module 100 because audio content is now available when browsing on the portable module 100.

The base module 200 may incorporate appropriate processing circuitry corresponding to the types of files or voicemails to be played back through the portable module 100. Alternatively, the portable module 100 may include basic processing circuitry to generate output signals suitable for driving a speaker in the base module 200.

Another embodiment of the information system 10 provides for transferring audio files from the base module 200 to the portable module 100. Further, if the portable module 100 communicates over the wireless network 300, the user may then send audio files over the network 300.

However, if the portable module 100 does not include audio or sound processing features, the base module 200 may still be used to record audio files which may be stored in the base module 200 and/or the portable module 100 when the portable module 100 is in its mounted position. The user may then forward the audio file using the portable module 100, or simply store the file for later use. Audio files recorded in this manner may be voice messages, sound clips, recording of telephone conversations and the like.

Furthermore, if the base module 200 does not include a memory subsystem, the portable module 100 provides both a memory subsystem 120 for recording audio files and a means for sending such audio files from the base module 200. The base module 200 similarly provides audio processing and transducers for the portable module 100 to play back audio files stored at the portable module 100 and record audio inputs for storage in the first memory subsystem 120 of the portable module 100.

Figure 17:
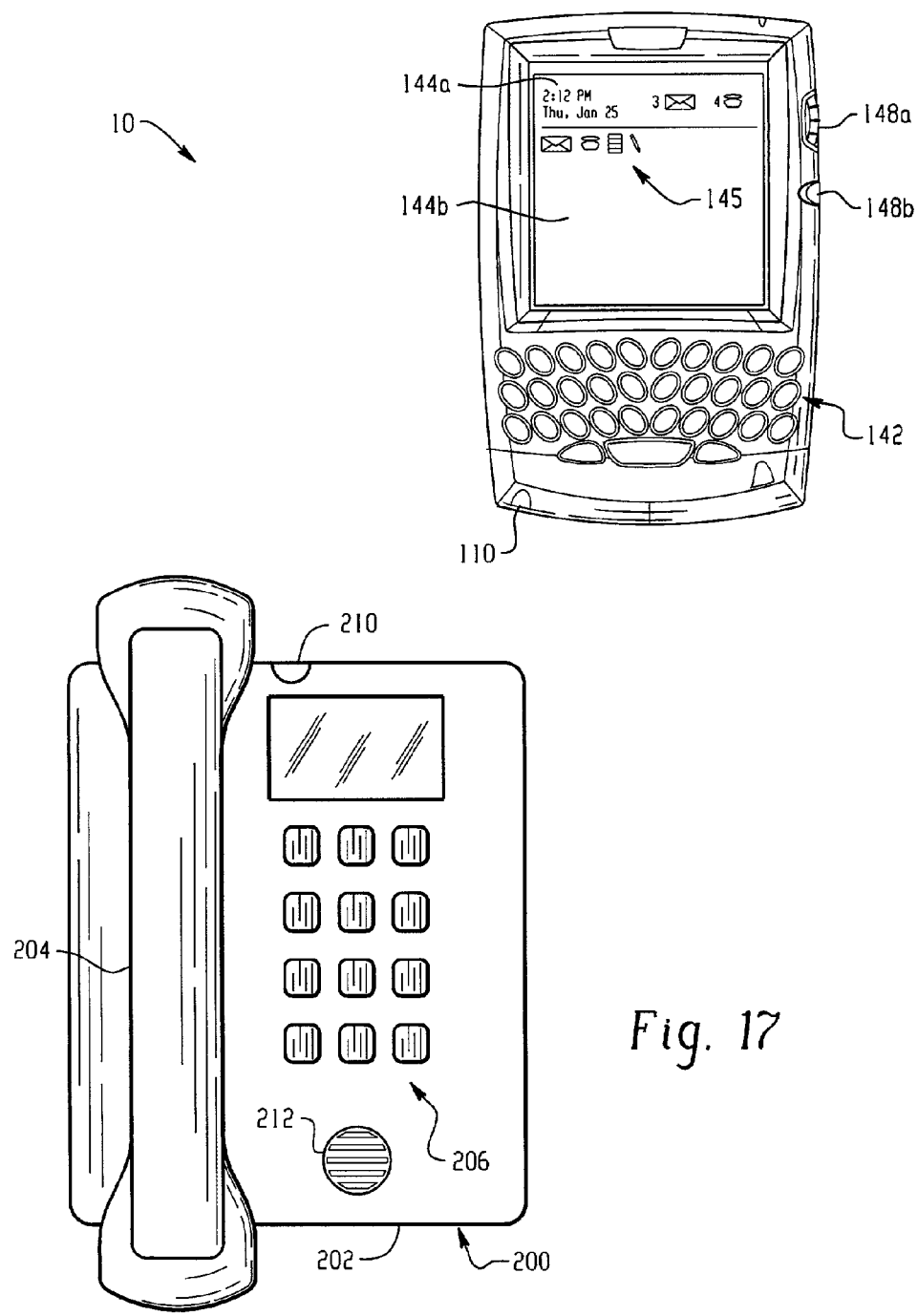
FIG. 17 is a diagram of another embodiment of the information system in which the base module does not have a receiving portion.

The above embodiments of the information system 10 have been described in the context of the portable module 100 being received in a receiving portion 230 of the base module 200. When the portable module 100 is received in the receiving portion 230 of the base module 200, communication over the communication ports 110 and 210 is established. However, communication over the communication ports 110 and 210 may also be established when the portable module 100 is not received in the receiving portion 230. FIG. 17 is a diagram of another embodiment of the information system 10 in which the base module 200 does not have a receiving portion 230. In this embodiment, the portable module 100 communicates with the base module 200 when the portable module 100 is within a transmission range of the base module 200, or, alternatively, when transmission is enabled by the user of the portable module 100.

The transmission range may depend of the communication devices used to realize the communication ports 110 and 210. For example, if the communication ports 110 and 210 comprise infrared transceivers, the transmission range may be limited to a room in which the portable module 100 and the base module 200 are located. On the other hand, if the communication ports 110 and 210 comprise RF transceivers, the transmission range may be expanded to several adjacent rooms or even further. Illustratively, a portable module 100 and a base module 200 interoperating over a RF link may provide a user with caller ID information for an incoming phone call to the base module 200 via the module display 144 when the user is in another room. Furthermore, the portable module 100 may answer the incoming phone call to the base module 200. Thus, the phone call is placed over the telephone network 320, and the portable module 100 communicates over the telephone network 320 via the communication ports 110 and 210 and the base module 200.

Figure 18:
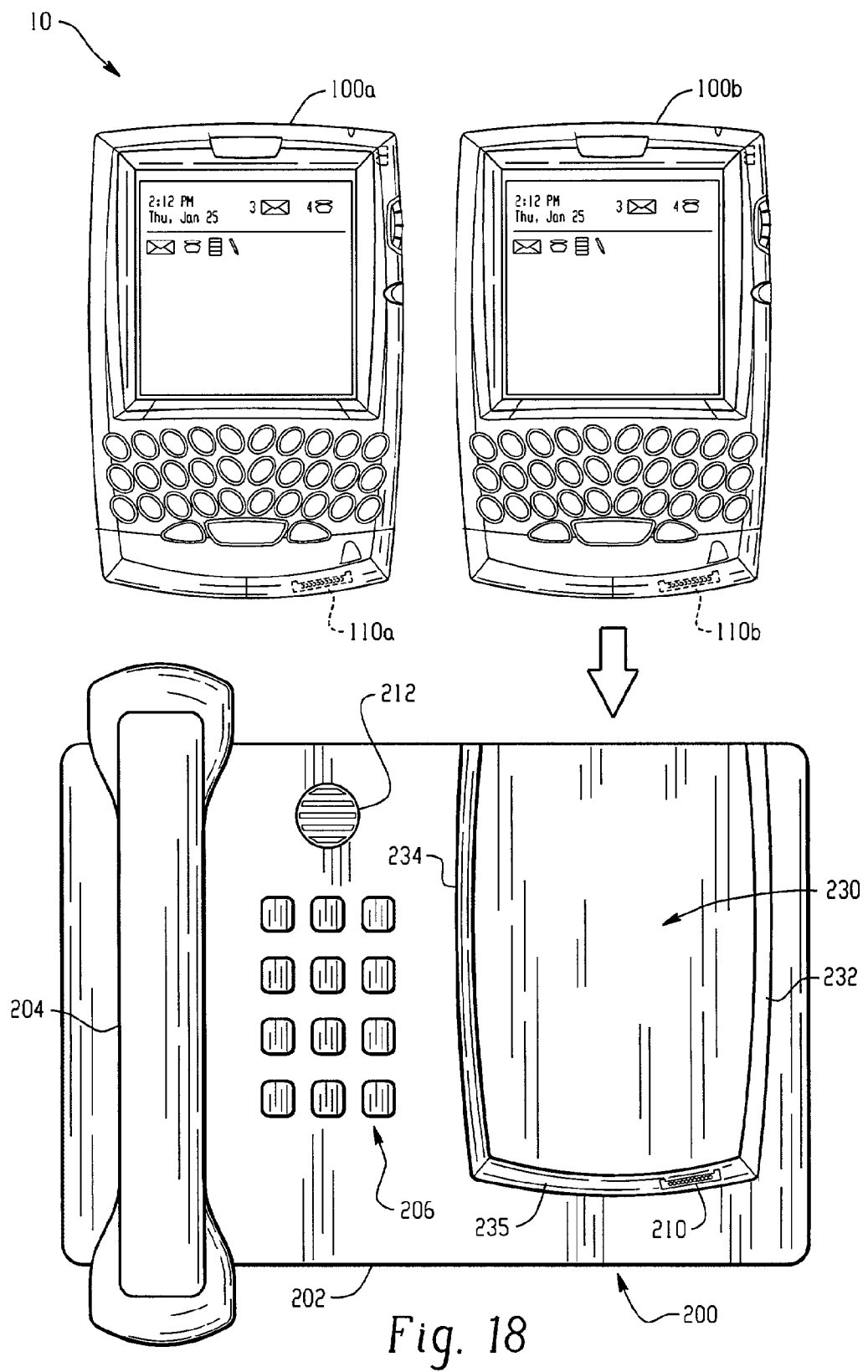
FIG. 18 is a diagram of another embodiment of the information system including multiple portable modules.

The above embodiments of the information system 10 have been described primarily in the context of a base module 200 having a single associated portable module 100. More than one portable module 100 may be associated with a base module 200. FIG. 18 is a diagram of another embodiment of the information system 10 including multiple portable modules 100a and 100b. Each portable module 100a and 100b communicates with the base module 200 via ports 110a and 110b, respectively. Each portable module 100a and 100b may also perform different functions 102a and 102b, respectively. For example, portable module 100a may be a voice module, such as a cellular telephone, and portable module 100b may be a data module, such as a PDA. Each portable module 100a and 100b may also incorporate different communication means for ports 110a and 110b; accordingly, the base module 200 will also include corresponding communication means to communicate over each communication port 110a and 110b.

Each portable module 100a and 100b may include a particular device identification number as described above. The base module 200 may access the first memory subsystem 120 of a portable module 100 to obtain the identification number, or a portable module 100 may transfer its identification number to the base module 200 when placed in a mounted position. If the portable module 100 is a GPRS device, then the base module 200 may be configured to determine an identity by accessing a SIM card installed in the portable module 100.

Functions 102a and 102b may include common functions and features, such as storing and accessing contact data. Information may be transferred between any portable module 100a and 100b and the base module 200.

Furthermore, the base module 200 may include a memory subsystem and may store information in a plurality of distinct memory locations, each of which preferably corresponds to one or more modules 100. Illustratively, a second memory subsystem 220 in the base module 200 includes a memory area dedicated to the base module 200, memory areas for each portable module 100a and 100b, and a further memory area for common storage for data common to the base module 200 and portable modules 100a and 100b.

When a portable module 100a is placed in a mounted position, data stored in a memory first subsystem in that portable module may be synchronized with memory areas dedicated to the portable module 100a and a common storage area. Data may also be synchronized with a memory area for portable module 100b and the base module 200. Thus, data stored in each portable module 100a and 100b may include unique and common data. For example, both portable modules 100a and 100b associated with the base module 200 may store common emergency contact information but different personal contact information.

In another embodiment, the data corresponding to a particular portable module 100 in a memory area in the base module 200 may only be accessible by the particular portable module 100.

The features of the information system 10 described with reference to FIGS. 1-17 are likewise available to modules 100a and 100b. Each portable module 100a and 100b and the base module 200 cooperate substantially as described above to provide for such features as appropriate for each combination.

Figure 19:
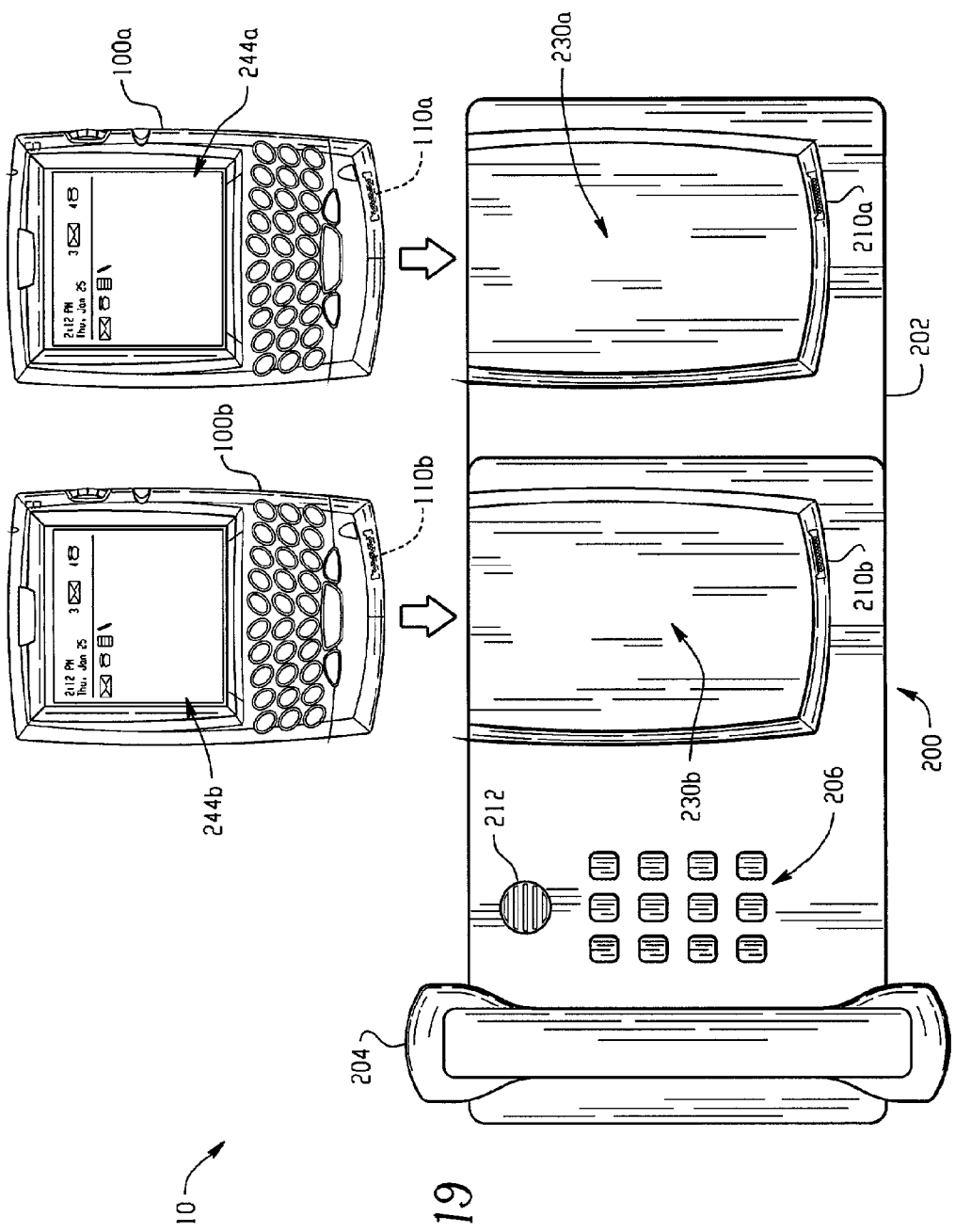
FIG. 19 is a diagram of another embodiment of the information system including multiple portable modules and multiple receiving portions in the base module.

FIG. 19 is a diagram of another embodiment of the information system including multiple portable modules 100a and 100b and multiple receiving portions 230a and 230b. The features of the information system 10 described with reference to FIGS. 1-17 are likewise available to modules 100a and 100b. Furthermore, multiple interoperations may occur simultaneously. For example, portable module 100a may exchange data with the base module 200, and portable module 100b may be used to route phone calls over a wireless network 300 from base module 200.

When a portable module display 144 is to be used to display base module 200 information as described above, the portable module display 144 of one of the portable modules 100a and 100b will preferably be used for such purpose at any one time. The base module 200 and portable modules 100a and 100b may be configured such that when both portable modules 100a and 100b are mounted in the receiving portions 230a and 230b, base module 200 information is displayed in a default portable module, illustratively 100a. If the portable module 100a is detached from the base module 200, then the base module 200 information will preferably be displayed on the portable module display 244b of portable module 100b.

Such display switching may also be invoked when a current default portable module 100a is used to perform its own resident functions when in its mounted position. Illustratively, if the default portable module 100a is a data module, such as a PDA, and a calculator function is invoked, then the base module 200 information is displayed on the display 244b of the portable module 100b. If both modules 100a and 100b are in use, then the default portable module 100a may be configured to display base module 200 information on a portion of its display screen, as described above with reference to FIGS. 3 and 4.

Figure 20:
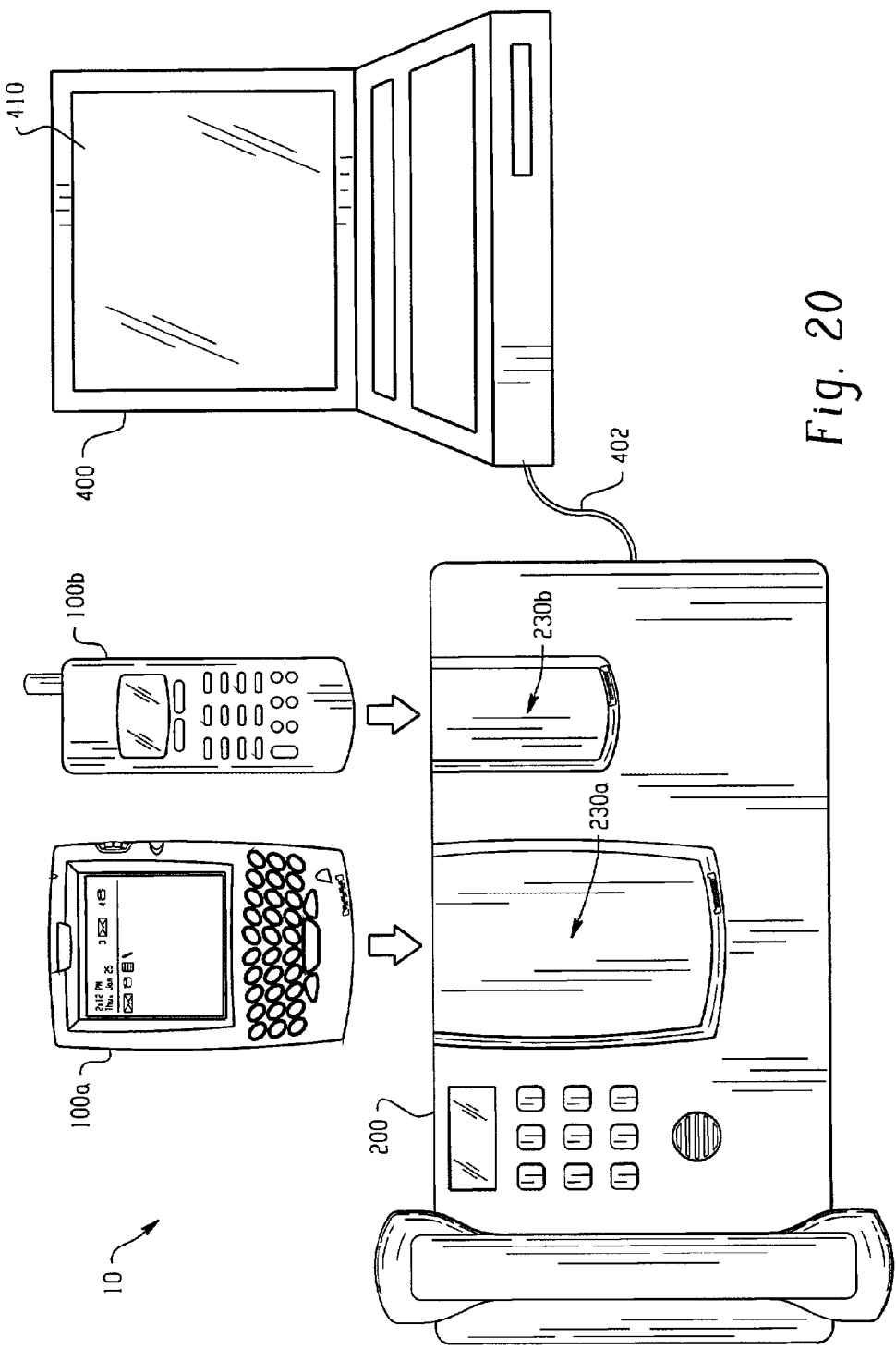
FIG. 20 is another embodiment of the information system including a telephone having a first receiving portion for a PDA and a second receiving portion for a cellular telephone.

The embodiment of FIG. 19 may be adapted to provide interoperation between a telephone, a PDA, and a cellular telephone, as shown in FIG. 20. FIG. 20 is another embodiment of the information system including a telephone having a first receiving portion for a PDA and a second receiving portion for a cellular telephone. The base module 200 is illustratively a telephone, the portable module 100a is illustratively a PDA, and the portable module 100b is illustratively a cellular telephone. As previously described, multiple interoperations of functions between the telephone 200, the PDA 100a and the cellular telephone 100b may occur simultaneously. For example, when the PDA 100a and the cellular telephone 100b are received in receiving portions 230a and 230b, respectively, telephone calls to the cellular telephone 100b may be routed from a wireless communication network to the telephone 200 over a telephone network. Furthermore, calls received on the telephone 200 may be recorded and stored in a first memory subsystem of the PDA 100a.

In another example, recorded conversations or audio files stored in the first memory subsystem of the PDA 100a may be played during a telephone conversation conducted over a telephone network via telephone 200, or over a wireless communication network over the cellular telephone 100b. As described above, such stored files may instead be played back locally, through a receiver or speaker of the telephone 200.

A computer 400 may also be in communication with a telephone 200 over a link 402. Illustratively, the link 402 is a serial cable. Of course, communication between the telephone 200 and the computer 400 may be established by other means, including the wireless communication means as previously described.

The computer 400 may, for example, access the first memory subsystem of the PDA 100a, and the first memory subsystem of the cellular telephone 100b. Furthermore, the computer 400 may also have access to a second memory subsystem of the telephone 200.

A user may further interoperate the telephone 200, the PDA 100a, and the cellular telephone 100b through the computer 400. A communication management program stored and executed on the computer 400, allows the user to access the telephone 200 functions, the PDA 100a functions, and the cellular telephone 100b functions. Furthermore, the computer 400 may also store a master database in which data downloaded from the telephone 200, the PDA 100a, and the cellular telephone 100b is consolidated.

A base module 200 may also be operable to provide generic and restricted functions. A base module 200 may be associated with a first portable module 100a and provide both generic and restricted functions when the portable module 100a is in communication with the base module 200 over first and second communication ports 110 and 210. Illustratively, displaying caller identification on the portable module display 144 and enabling local calling are generic functions. Enabling long distance calling, recording a phone conversation on the base module 200 into the first memory subsystem 120 of the portable module 100, and accessing data stored in a second memory subsystem 220 of the base module 200 are restricted functions. Thus, a first user with the first portable module 100a has access to both generic and restricted functions. However, a second user with a second portable module 100b may have access only to the generic functions on the base module 200 if it is not associated with the base module 200.

Access to the restricted functions may further be limited by requiring a passcode to be entered when the portable module 100 is placed in a mounted position on base module 200. The passcode provides added security in the event that a portable module 100 is lost or stolen.

The passcode may also be used to enable restricted functions on a base module 200 with which a portable module 100 is not associated. As described above, the base module 200 may detect an identification number of a portable module 100 that is placed in a mounted position to determine whether or not a passcode prompt is required. If a passcode is required, then unless a user enters a valid passcode, access to any restricted functions is denied.

The designation of particular functions as generic or restricted is preferably made by the user or a system administrator. Furthermore, different classifications of generic functions and restricted functions may also be defined. For example, a corporate user may be able to access all generic and restricted functions on his or her own telephone set, and all "corporate-generic" functions from any other corporate telephone set. However, a visitor to corporate premises may be permitted access only to visitor generic functions, such as portable module 100 charging/powering and local telephone calling.

Figure 21:
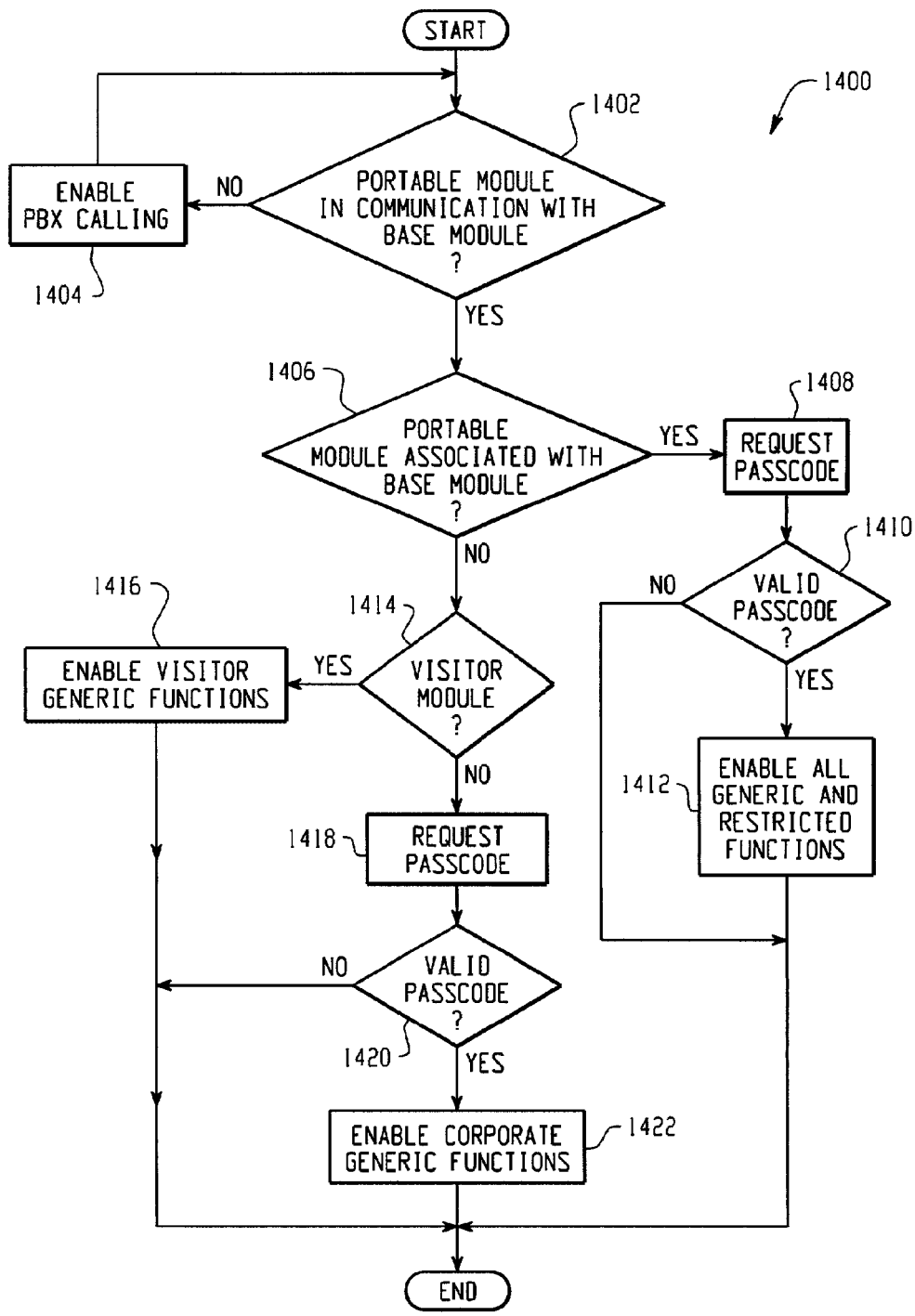
FIG. 21 is a flow diagram illustrating generic and restricted function access.

FIG. 21 provides a flow diagram 1400 illustrating generic and restricted function access as implemented in a corporate setting. In step 1402, the information system 10 determines whether the portable module 100 is in communication with the base module 200 over communication ports 110 and 210. If communication is not established, then the information system 10 enables only PBX calling within a corporation as shown in step 1404.

However, if communication is established, then step 1406 determines whether the portable module 100 is associated with the base module 200. If the portable module 100 is associated with the base module 200, step 1408 requests a passcode from the user. In step 1410, the information system 10 determines whether a valid passcode has been received. If a valid passcode is received, then step 1412 enables all generic and restricted functions to the user.

Returning to step 1406, if the portable module 100 is not associated with the base module 200, then step 1414 determines whether the portable module 100 is a visitor module. If the portable module 100 is a visitor module, then step 1416 enables visitor generic functions. Illustratively, visitor generic functions include local calling from the corporate premises.

If the portable module 100 is not a visitor module, however, then a passcode is requested in step 1418. In step 1420, the system 10 determines whether a valid passcode has been input by the user. If a valid passcode has been input by the user, step 1422 enables corporate generic functions.

Figure 22:
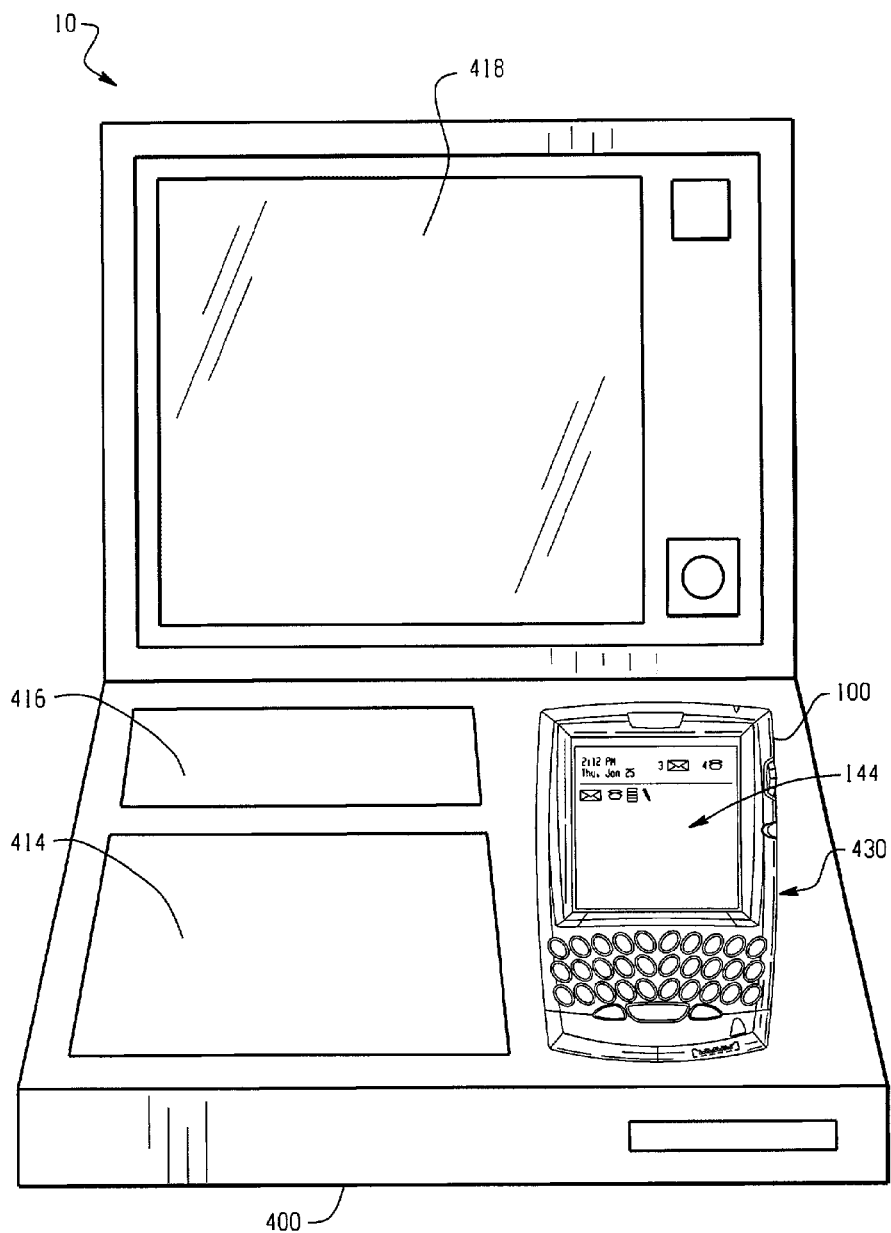
FIG. 22 is another embodiment of the information system wherein a portable module is received in a computer having a receiving portion.

FIG. 22 is another embodiment of the information system 10 wherein a portable module 100 is received in a computer 400 having a receiving portion 430. The computer 400 includes a keyboard 414, a set of auxiliary input keys 416, and a display 418. The portable module 100 may be mountable on the keyboard portion of the computer 400, as shown in FIG. 22, or adjacent to the display 418. The computer 400 and portable module 100 may also be adapted such that the portable module 100 or a part thereof is inserted into an enclosed mounting cavity to enable the portable module 100 to communicate with the computer 400.

Of course, rather than being received in the receiving portion 430 of the computer 400, the portable module 100 may communicate with the computer 400 via a short range link as previously described, thus eliminating the receiving portion 430.

Figure 23:
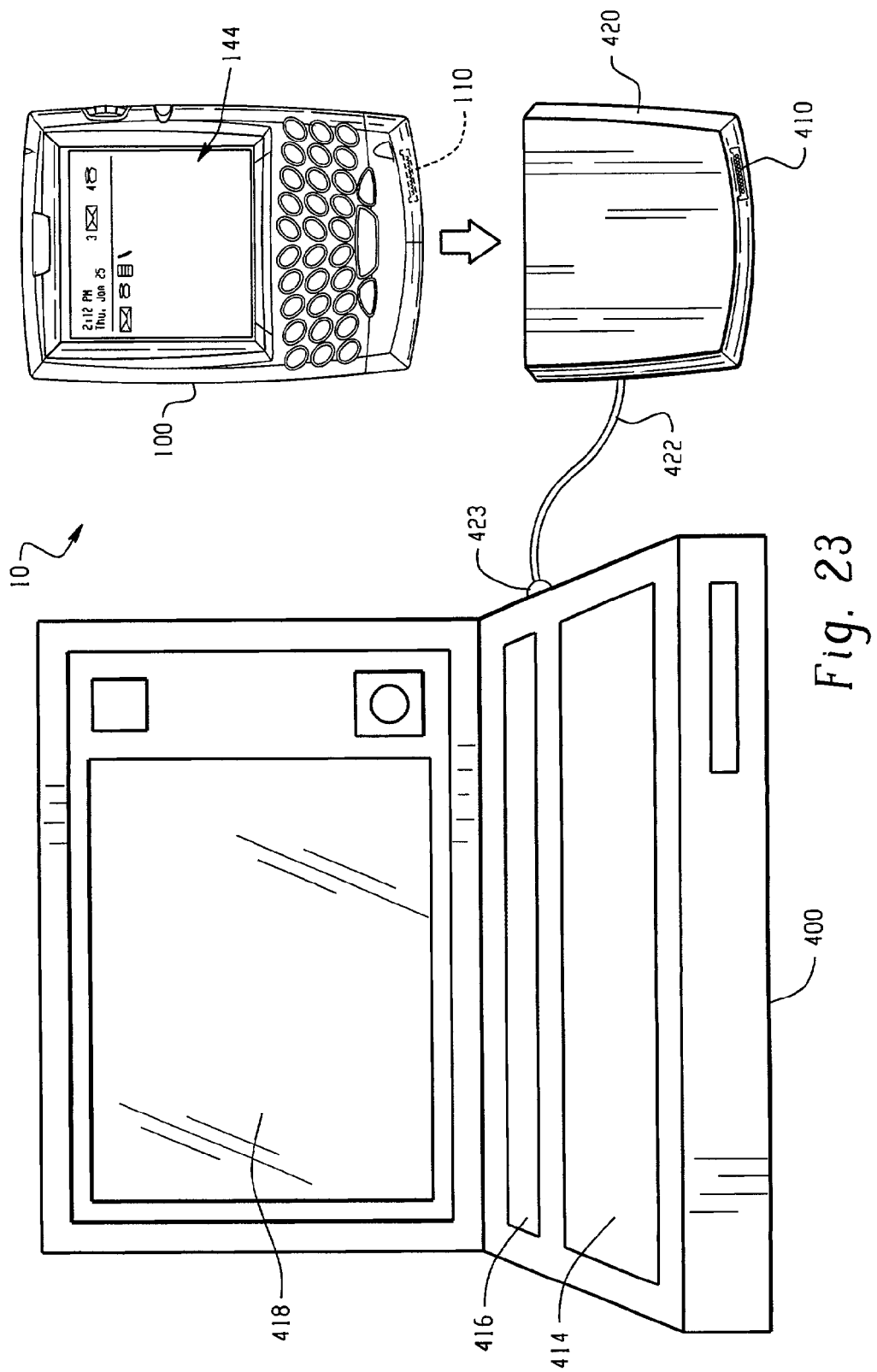
FIG. 23 is another embodiment of the information system wherein the portable module includes a mounting base operable to communicate with the computer via a cable.
Figure 24:
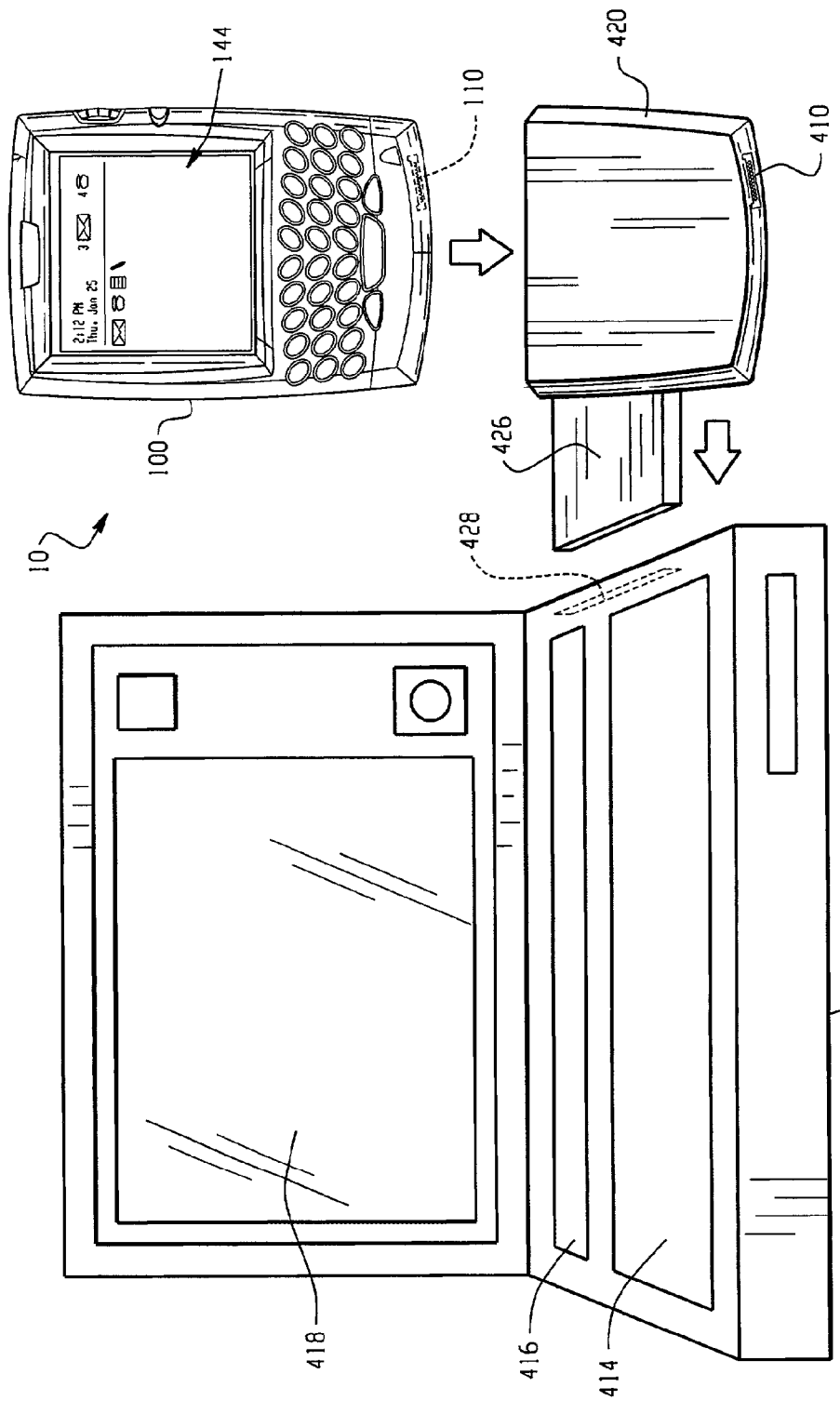
FIG. 24 is another embodiment of the information system wherein the portable module includes a mounting base received by the computer in a receiving slot.

Alternatively, separate mounting components 420 may be provided, as shown in FIGS. 23 and 24. FIG. 23 is another embodiment of the information system wherein the portable module includes a mounting base operable to communicate with the computer via a cable. FIG. 24 is a further embodiment of the information system wherein the portable module includes a mounting base received by the computer in a receiving slot In FIG. 23, the mounting component 420 is connected to computer 400 through a cable 422 and a port 423 on the computer 400. The mounting component 420 of FIG. 24 communicates with the computer 400 through an expansion slot such as a PCMCIA port 428 and corresponding computer card 426. The card 426 may be separate from both the computer 400 and mounting component 420, or may alternatively be integrated with the mounting component 420. A portion of the card 426 is inserted into the expansion slot or port 428 to provide for communication between the portable module 100 and computer 400.

A communication link between the portable module 100 and the computer 400 via communication ports 110 and 410 provides interoperation substantially as described above. Thus, if the portable module 100 lacks processing resources required for certain file types, such as voice messages, audio files and images, the files may be processed using the computer 400. In the case of a voice message or audio file, the files may preferably be played back through a sound subsystem on the computer 400. Image files, including still images and video files, may similarly be viewed or played by the computer 400. If the portable module 100 is further enabled for Internet browsing, audio and image processing resources of the computer 400 may be utilized.

The computer 400 may also be used to prepare data or files which may then be transferred to the portable module 100 when the device is in its mounted position or otherwise in communication with the computer 400. Such files may then be stored in the first memory subsystem on the portable module 100 for later use on the portable module 100 or other equipment with which the portable module 100 may be mounted, or transferred over a wireless communication network from the portable module 100. The computer 400 may also provide power terminals for powering the portable module 100 as similarly described with reference to FIGS. 3 and 4.

Accordingly, a suitably adapted computer 400 may effectively provide additional input and output capabilities for a portable module 100. In another embodiment, the portable module 100 provides wireless modem functionality to the computer 400. When a portable module 100 is mounted on or in communication with the computer 400, the computer 400 is preferably able to implement the portable module 100 as a wireless modem for the computer 400. A user may then use the computer 400 directly to send and receive data, files, emails and the like and perform Internet browsing functions.

Non-communication functions supported by the portable module 100 are preferably operable when the portable module 100 in use by the computer 400 as a wireless modem. Additionally, the user may select and preferably switch between a portable module-controlled communication mode and a computer-controlled communication mode.

Figure 25:
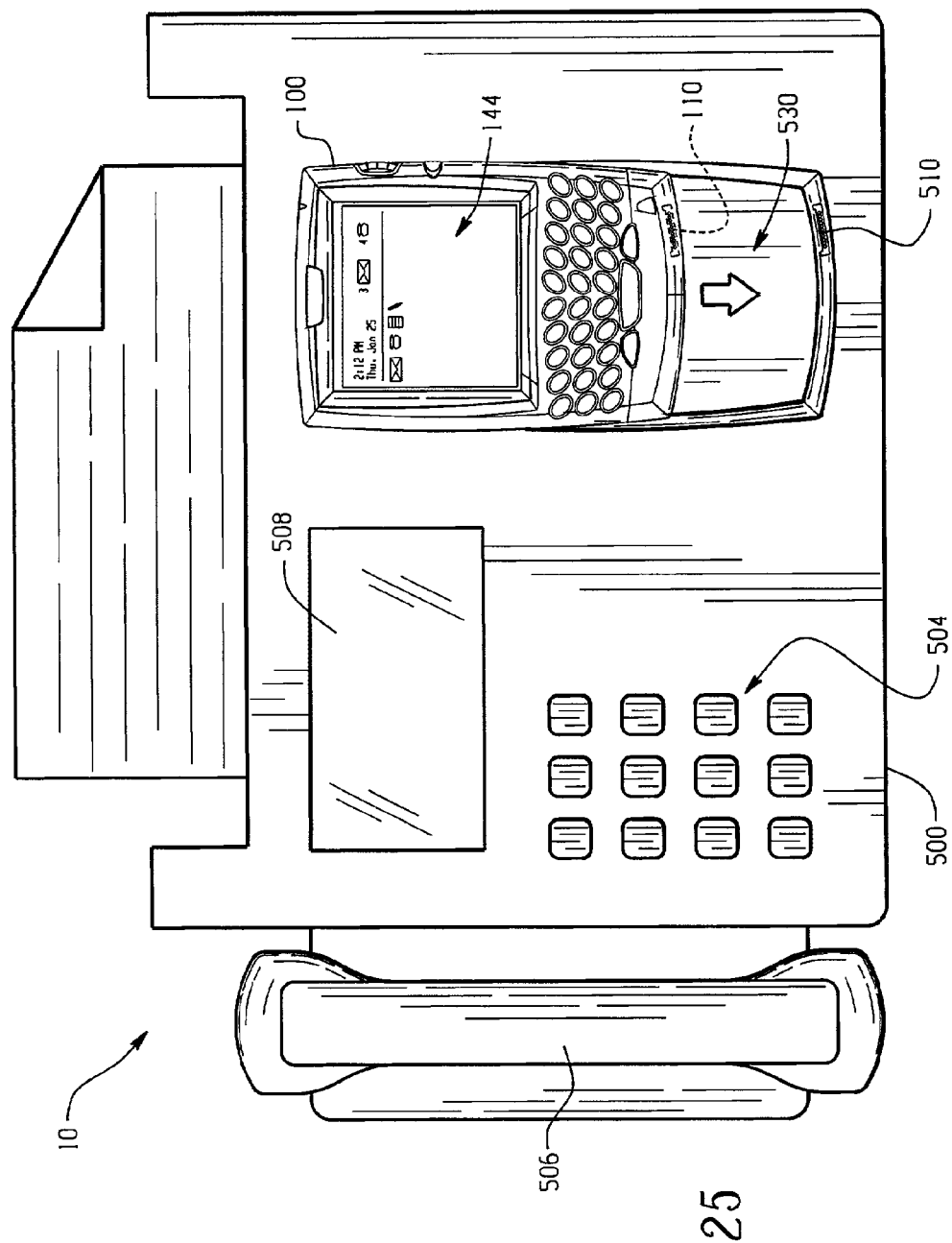
FIG. 25 is another embodiment of the information system wherein the portable module is received in a receiving portion of a facsimile machine.

FIG. 25 is another embodiment of the information system wherein the portable module is received in a receiving portion of a facsimile machine. In FIG. 25, a portable module 100 is mountable on a facsimile machine 500. The facsimile machine 500 has a keypad 504 for entering a destination facsimile number, a handset 506 for placing voice calls and a display screen 508. A communication link between the portable module 100 and the facsimile machine 500 via communication ports 110 and 510 provides interoperation substantially as described above.

Contact information including contact names and associated facsimile numbers may be transferred between the portable module 100 and the facsimile machine 500. The display 144 of the portable module 100 may therefore be used to display facsimile machine information when the portable module 100 is in its mounted position, particularly where the facsimile machine 500 does not have its own display screen or its display screen 508 is relatively small. If file types compatible with the facsimile machine 500 are stored on the portable module 100, then such files may be transferred to the facsimile machine 500 for printing or transfer to another facsimile machine.

Similarly, the portable module 100 or facsimile machine 500 may support file conversions such that other file types may be converted to facsimile-compatible file types, files of such other types may be transferred from the portable module 100 to the facsimile machine 500 for printing or sending. Received facsimiles may also be printed by the facsimile machine 500, transferred from the facsimile machine to the portable module 100, or both.

Placing calls from the facsimile machine 500 based on contact data selected in the portable module 100, substantially as described above in conjunction with base module 200, may be implemented in the facsimile machine 500 embodiment of FIG. 25. Furthermore, if the portable module 100 is operable to receive facsimile transmissions, the facsimile transmission may be printed out at the facsimile machine 500.

Although a receiving portion 530 is shown in FIG. 25, the previously described port- or expansion slot-based connection, separate mounting component or a short-range wireless communication link may be implemented to provide for communication between the portable module 100 and the facsimile machine 500.

Figure 26:
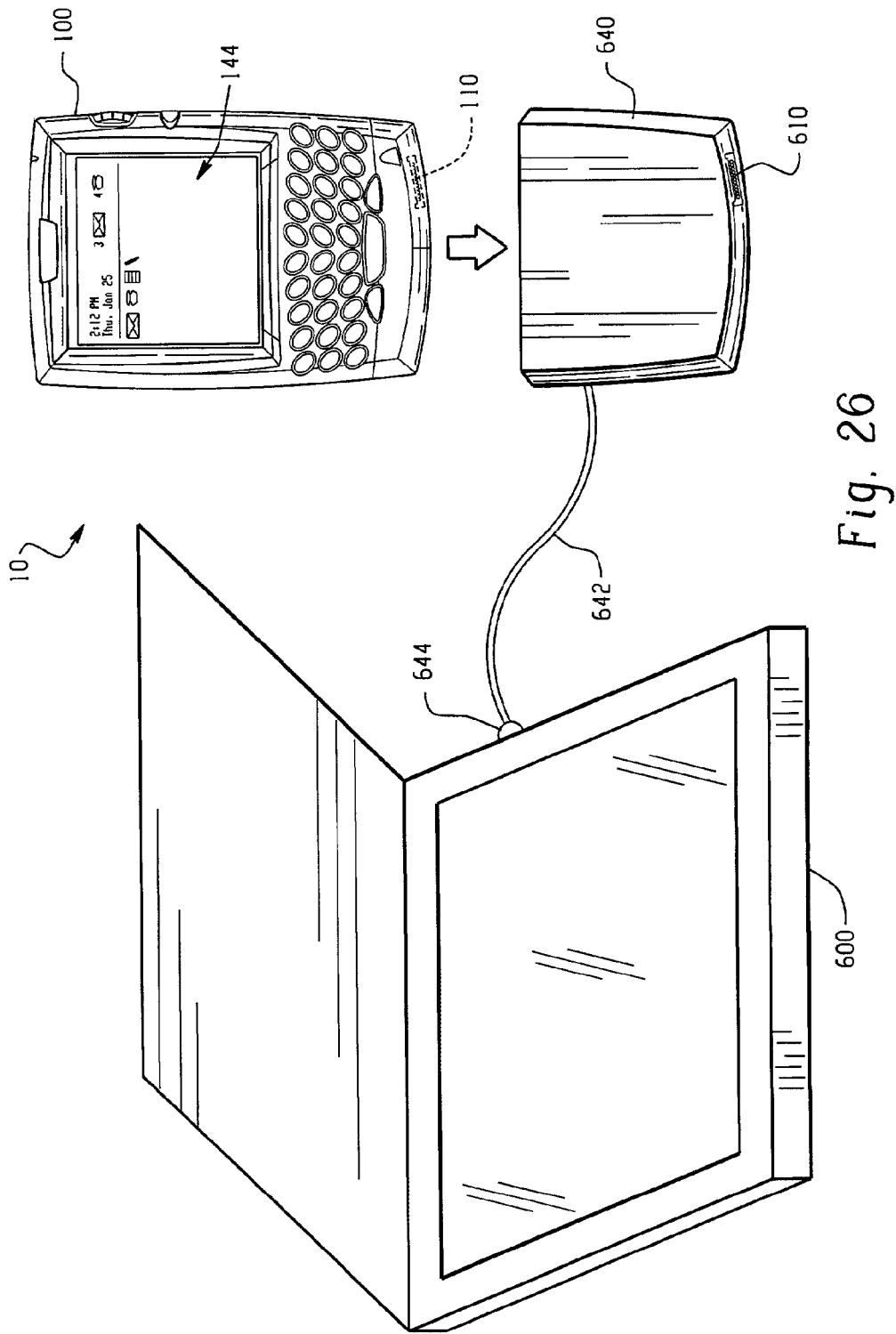
FIG. 26 is another embodiment of the information system wherein the portable module includes a mounting base operable to communicate with a scanner via a cable.
Figure 27:
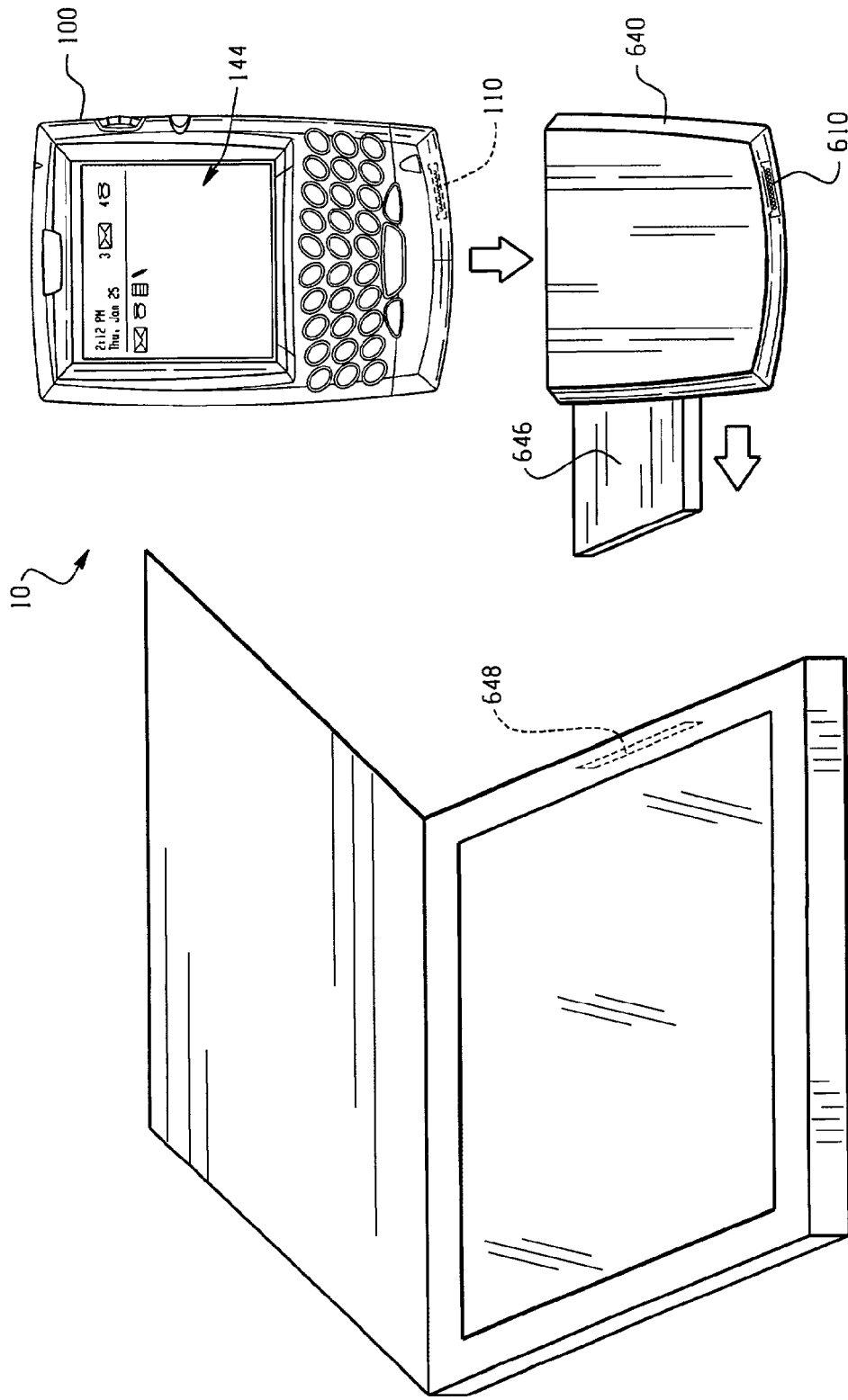
FIG. 27 is another embodiment of the information system wherein the portable module includes a mounting base received by the scanner in a receiving slot.

FIGS. 26 and 27 show arrangements whereby the portable module 100 interoperates with a scanner 600. FIG. 26 is an embodiment of the information system wherein the portable module includes a mounting base operable to communicate with a scanner via a cable, and FIG. 27 is another embodiment of the information system wherein the portable module includes a mounting base received by the scanner in a receiving slot. A communication link between the portable module 100 and the scanner 600 via communication ports 110 and 610 provides for information transfer and interoperation, substantially as described above. In FIG. 26, the scanner 600 communicates with the portable module 100 through a cable 642 connecting a mounting component 640 to a port 644. The scanner 600 in FIG. 27 incorporates an expansion port or slot 648 adapted to receive a computer card 646. The computer card 646 is either connectable to or integrated with the mounting component 640, as described above with reference to FIG. 24. A mounting cavity or wireless link (not shown) may also enable communication between the portable module 100 and the scanner 600.

When a document is scanned by the scanner 600, the resultant data representing the document may be transferred to the portable module 100. This data may then be stored on the portable module 100 for later use, sent over a wireless communication network, or transferred to another device with which the portable module 100 may communicate. Other features which may be implemented in portable module 100 and scanner 600 embodiment include scanner information display on the portable module display 144 and portable module 100 powering and/or power source charging from a scanner power source.

Figure 28:
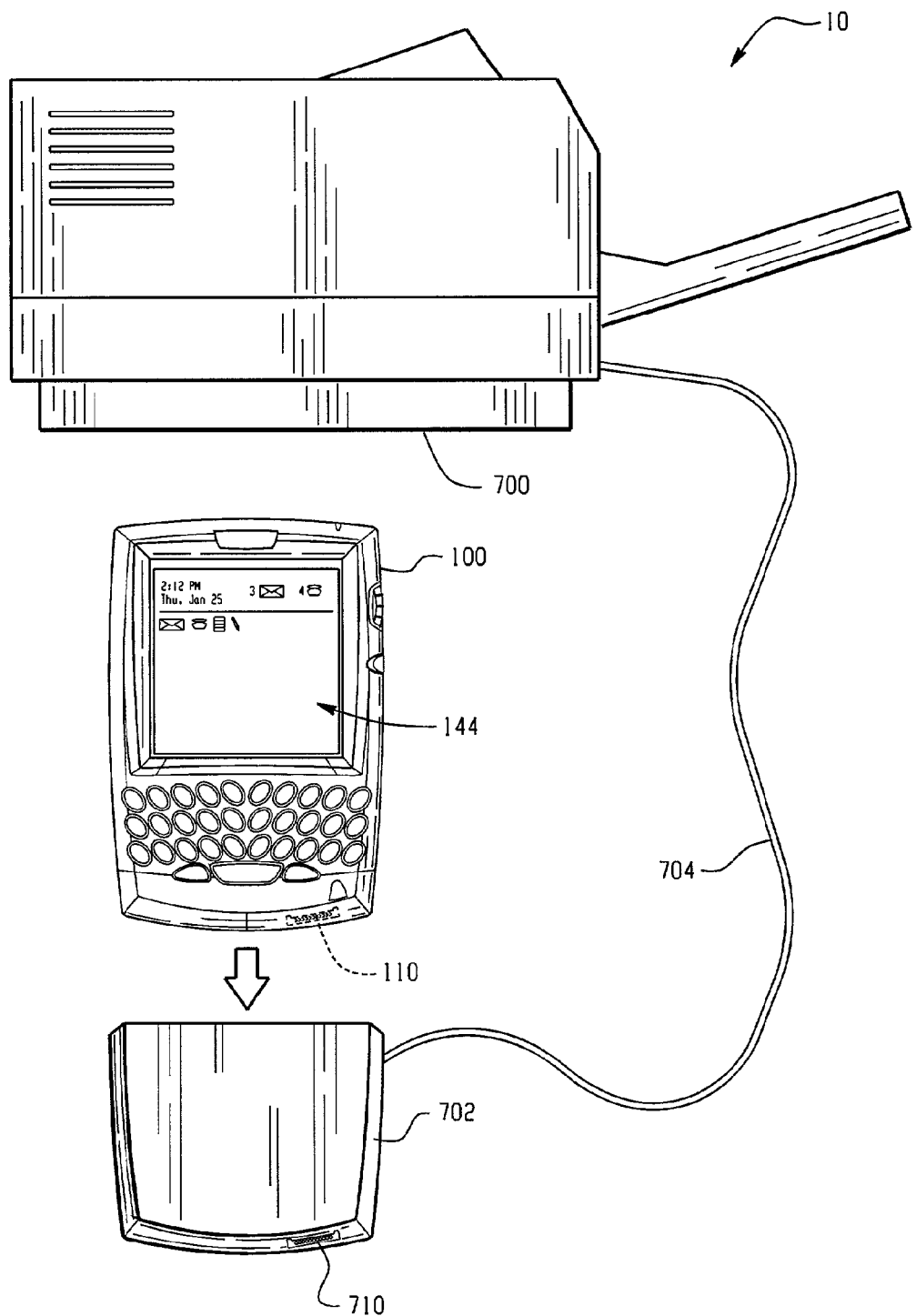
FIG. 28 is another embodiment of the information system wherein the portable module includes a mounting base operable to communicate with a printer via a cable.
Figure 29:
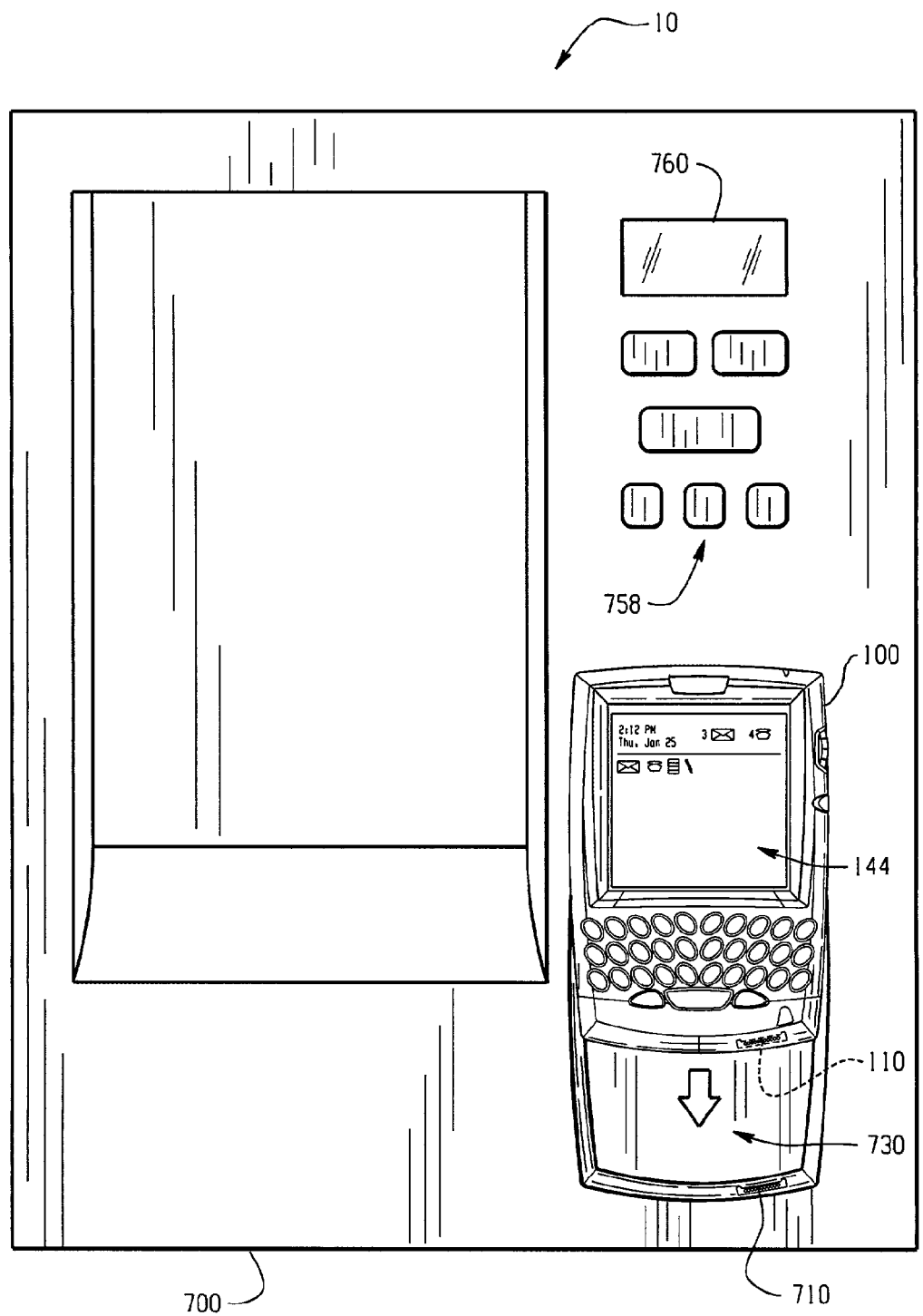
FIG. 29 is another embodiment of the information system wherein the portable module is received in a receiving portion of a printer.

In FIGS. 28 and 29, a portable module 100 interoperates with a computer printer 700. FIG. 28 is an embodiment of the information system wherein the portable module includes a mounting base operable to communicate with a printer via a cable, and FIG. 29 is another embodiment of the information system wherein the portable module is received in a receiving portion of a printer. As shown in FIG. 28, the portable module 100 communicates with printer 700 through a wired connection 704 and mounting component 702. The mounting component 702 may also be of the type shown in FIG. 24, which communicates with the printer 700 via a computer card and a corresponding port or slot in the printer 700.

The printer 700 of FIG. 29 has a receiving portion 730 in its top surface adapted to receive the portable module 100. The printer 700 normally has multiple keys 758 for operation. A typically small display screen 760 is also normally provided in order to display status information, error signals and the like.

The printer 700 and the portable module 100 interoperate to print information that is stored in the first memory subsystem 120 the portable module 100. Such stored information that a user may wish to print may include email messages, task lists, calendar appointments, notepad contents, contact information, and stored files. A user may preferably also compose information or files on the portable module 100 for immediate printing on the printer 700.

Printer 700 information may also be displayed on the portable module display 144. The portable module display 144 may be used in conjunction with or instead of the printer display 760. When the portable module 100 is in its mounted position, its display 144 is either entirely or partially used to display printer information, substantially as described above in the base module 200 embodiments of FIGS. 1-17. If the printer display 760 is inactive or displays only the same information as the portable module display 144 when the portable module 100 is in its mounted position, then the receiving portion 730 may be positioned in proximity to the printer display 760 in order to minimize space requirements, as previously described with reference to FIGS. 7 and 8. Device powering and/or power source charging from a printer 700 power source are also preferably implemented.

In accordance with a further embodiment of the information system 10, a single portable module 100 may be mounted on any suitably adapted other device. As described briefly above, certain interoperation functions, such as device power source recharging and device powering for example, may be classified as generic functions supported for all devices by any equipment adapted for mounting of a portable module 100. In such a system, a user may access any supported interoperation functions by mounting a mobile device 100 in a receiving portion or component associated with any suitably adapted equipment, including a telephone set, computer, facsimile machine, scanner and printer.

The embodiments described herein are examples of structures, systems or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

The invention claimed is:

1. An apparatus comprising:
    a base telephone configured for wired communication through a telephone line; and
    a portable telephone configured for wireless communication through a wireless network;
    the telephones being configured such that when a call is in progress through the portable telephone, mounting the portable telephone on the base telephone redirects the call to the base telephone for a user to continue the in-progress call using the base telephone.

2. The apparatus of claim 1 wherein, as the redirected call is continued through the base telephone, the redirected call is communicated over the wireless network through the portable telephone to the base telephone.

3. The apparatus of claim 1 wherein the portable and base telephones are configured to have a mounted configuration in which the portable telephone is removably mounted on the base telephone and covers the base telephone's display, and the telephones communicate with each other for the portable telephone's display to display information relating to operation of the base telephone.

4. The apparatus of claim 3 wherein, in the mounted configuration, the portable telephone covers the base telephone's keypad.

5. The apparatus of claim 3 wherein, in the mounted configuration, the portable telephone controls operation of the portable telephone's display.

6. The apparatus of claim 3 wherein, in the mounted configuration, the portable telephone has access to functions and features of the base telephone.

7. The apparatus of claim 3 wherein, in the mounted configuration, the base telephone has access to functions and features of the portable telephone.

8. The apparatus of claim 3 wherein, in the mounted configuration, the base telephone controls operation of the portable telephone's display.

9. The apparatus of claim 3 wherein, in the mounted configuration, the base telephone is configured to place phone calls based on contact data stored in the portable telephone.

10. The apparatus of claim 3 wherein the base telephone is configured to automatically return a call received by the portable telephone when the portable telephone is mounted on the base telephone.

11. The apparatus of claim 3 wherein the portable telephone is a cell phone.

12. The apparatus of claim 3 wherein, in the mounted configuration, the telephones communicate with each other wirelessly and can communicate with each other wirelessly even when the portable telephone is not mounted on the base telephone.

13. The apparatus of claim 3 wherein, in the mounted configuration, the telephones communicate with each other through a coupled serial connection.

14. The apparatus of claim 3 wherein the base telephone includes a cavity in which the base telephone's display is located and which receives the portable telephone in the mounted configuration.

15. An apparatus comprising:
a base telephone configured for wired communication through a telephone line; and
a portable telephone configured for wireless communication through a wireless network, the telephones being configured such that when a call is in progress through the portable telephone, mounting the portable telephone on the base telephone redirects the call to the base telephone for a user to continue the in-progress call using the base telephone, the telephones configured to operate in conjunction with a telephone network for handling base-telephone-directed calls, which are calls directed by callers to the base telephone, and a wireless network for handling portable telephone directed calls, which are calls directed by callers to the portable telephone; and
a gateway through which the networks communicate with each other;
the telephones and the gateway being together configured:
to direct the base telephone directed calls to the base telephone;
to route the portable telephone directed calls to the portable telephone when the portable telephone is not mounted on the base telephone;
in response to receiving a wireless control signal indicating the portable telephone is mounted on the base telephone, to re-route the portable telephone directed calls to the base telephone; and
to switch from routing a portable-telephone-directed call to the portable telephone to re-routing it to the base telephone even while the call is in progress in response to the network receiving the control signal indicating the portable telephone has been mounted on the base telephone while the call is in progress.

16. The apparatus of claim 15 wherein the control signal is transmitted by the portable telephone to the network.

17. The apparatus of claim 15 wherein the control signal is transmitted by the base telephone to the network.

* * * * *